US012596515B2

(12) United States Patent
Wänstedt et al.

(10) Patent No.: US 12,596,515 B2
(45) Date of Patent: Apr. 7, 2026

(54) FIRST DEVICE, COMMUNICATION SERVER, SECOND DEVICE AND METHODS IN A COMMUNICATIONS NETWORK

(71) Applicant: Telefonaktiebolaget LM Ericsson (publ), Stockholm (SE)

(72) Inventors: Stefan Wänstedt, Luleå (SE); Peter Ökvist, Luleå (SE); Tommy Arngren, Södra Sunderbyn (SE); Hans Hannu, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 250 days.

(21) Appl. No.: 18/275,264

(22) PCT Filed: Mar. 18, 2021

(86) PCT No.: PCT/EP2021/057012
§ 371 (c)(1),
(2) Date: Aug. 1, 2023

(87) PCT Pub. No.: WO2022/194380
PCT Pub. Date: Sep. 22, 2022

(65) Prior Publication Data
US 2024/0303023 A1 Sep. 12, 2024

(51) Int. Cl.
*G06F 3/14* (2006.01)
*H04L 12/18* (2006.01)
(Continued)

(52) U.S. Cl.
CPC ........ *G06F 3/1454* (2013.01); *H04L 12/1822* (2013.01); *H04L 65/1089* (2013.01); *H04N 23/611* (2023.01); *H04N 23/661* (2023.01)

(58) Field of Classification Search
CPC ....... G06F 3/1454; G06F 3/14; H04N 23/661; H04N 23/611; H04L 12/1822; H04L 65/1089
See application file for complete search history.

(56) References Cited

U.S. PATENT DOCUMENTS 10,403,050 B1  9/2019  Beall et al.
10,897,564 B1 *  1/2021  Smith .................. H04L 65/4015
(Continued)

FOREIGN PATENT DOCUMENTS

CN        107111863 A *  8/2017  ........... G06F 3/0412
WO       2016093750 A1   6/2016

OTHER PUBLICATIONS

Jenkins, et al., "Identifiable Images of Bystanders Extracted from Corneal Reflections, " PLoS ONE, vol. 8, Issue 12, Dec. 26, 2013, 6 pages.
(Continued)

*Primary Examiner* — Olisa Anwah
(74) *Attorney, Agent, or Firm* — Withrow & Terranova, PLLC

(57) ABSTRACT

A method performed by a first device for handling a sharing of a presentation in an ongoing real-time communication session between the first device and a second device in a communications network is provided. The presentation being displayed in a first screen of the first device and is to be shared in a second screen of the second device. Upon initiating the sharing of the presentation, the first device triggers a front facing camera at the second device to capturing one or more second images towards a face of a second user of the second device. The first device obtains a feedback relating to whether or not the presentation to be shared is visible at the second screen. The feedback being based on an examining of the one or more second images to identify reflections reflecting the presentation when dis-
(Continued)

301. Trigger a second front facing camera at the second device to capturing one or more second images towards a face of a second user of the second device 122.

302. Send one or more first images of the presentation displayed in the first screen to the communication server or to the second device.

303. Obtain a feedback relating to whether or not the presentation to be shared is visible at the second screen, which feedback is based on an examining of the one or more second images to identify reflections reflecting the presentation when displayed in the second screen that corresponds to the presentation displayed in the first screen.

played in the second screen that corresponds to the presentation displayed in the first screen.

16 Claims, 12 Drawing Sheets

(51) Int. Cl.
| | | |
|---|---|---|
| *H04L 65/1089* | (2022.01) | |
| *H04N 23/611* | (2023.01) | |
| *H04N 23/661* | (2023.01) | |

(56) References Cited

U.S. PATENT DOCUMENTS

| | | | | |
|---|---|---|---|---|
| 2015/0270983 A1* | 9/2015 | Givental | ................... | H04N 7/15 |
| | | | | 382/103 |
| 2016/0166140 A1* | 6/2016 | Lawrenson | ............. | G06T 15/04 |
| | | | | 351/208 |
| 2016/0277345 A1 | 9/2016 | Mochizuki et al. | | |
| 2016/0295165 A1 | 10/2016 | Mizuhara | | |
| 2017/0279860 A1 | 9/2017 | Agarwal et al. | | |
| 2019/0319993 A1* | 10/2019 | Christmas | ........ | H04N 21/43637 |
| 2020/0117415 A1 | 4/2020 | Lindblom | | |
| 2022/0053165 A1* | 2/2022 | Maini | ...................... | H04N 7/15 |
| 2023/0281778 A1* | 9/2023 | Thorsson | ........... | G06Q 10/1095 |
| | | | | 348/14.11 |

OTHER PUBLICATIONS

Zdziarskj, "Extracting Images from Reflections in the Eye," Zbigatron Blog, zbigatron.com/extracting-images-from-reflections-in-the-eye/, Nov. 10, 2017, 5 pages.
International Search Report and Written Opinion for International Patent Application No. PCT/EP2021/057012, mailed Nov. 26, 2021, 13 pages.

* cited by examiner

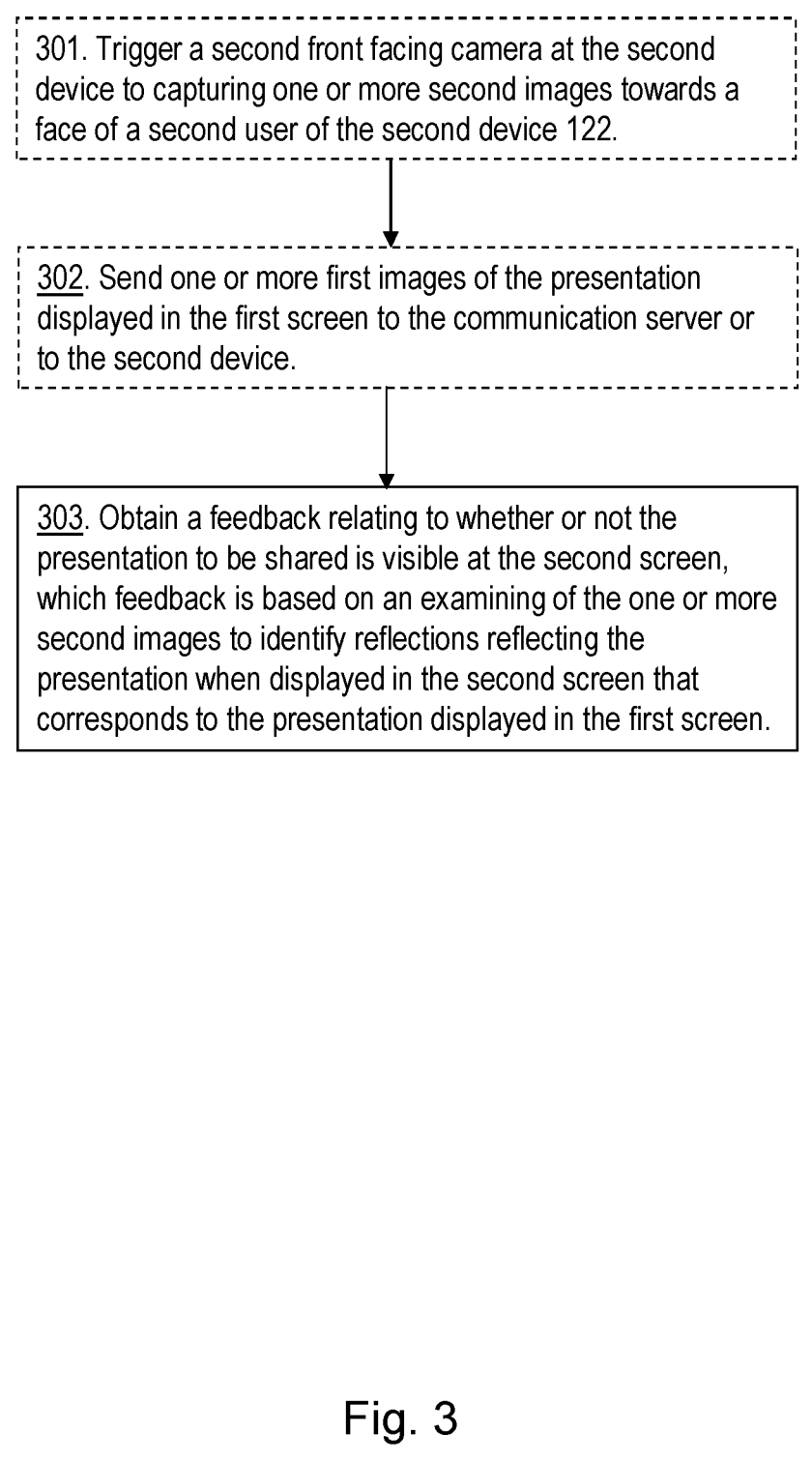

301. Trigger a second front facing camera at the second device to capturing one or more second images towards a face of a second user of the second device 122.

302. Send one or more first images of the presentation displayed in the first screen to the communication server or to the second device.

303. Obtain a feedback relating to whether or not the presentation to be shared is visible at the second screen, which feedback is based on an examining of the one or more second images to identify reflections reflecting the presentation when displayed in the second screen that corresponds to the presentation displayed in the first screen.

Fig. 3

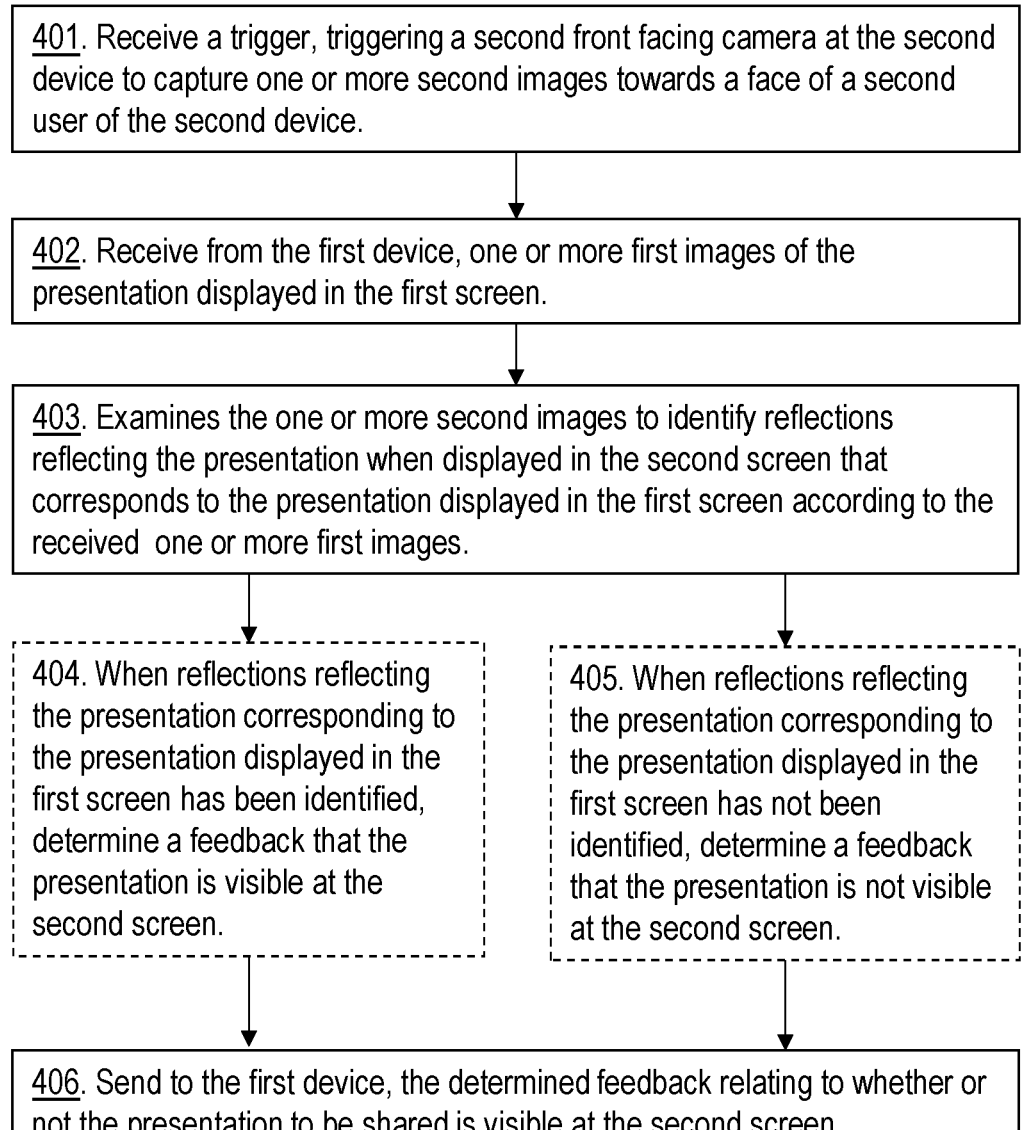

401. Receive a trigger, triggering a second front facing camera at the second device to capture one or more second images towards a face of a second user of the second device.

402. Receive from the first device, one or more first images of the presentation displayed in the first screen.

403. Examines the one or more second images to identify reflections reflecting the presentation when displayed in the second screen that corresponds to the presentation displayed in the first screen according to the received one or more first images.

404. When reflections reflecting the presentation corresponding to the presentation displayed in the first screen has been identified, determine a feedback that the presentation is visible at the second screen.

405. When reflections reflecting the presentation corresponding to the presentation displayed in the first screen has not been identified, determine a feedback that the presentation is not visible at the second screen.

406. Send to the first device, the determined feedback relating to whether or not the presentation to be shared is visible at the second screen.

Fig. 4

Computer program 780

Carrier 790

Memory 770

Processor 760

Input/Output Interface 700

Second device 122

Receiving Unit 720

Triggering Unit 710

Determining Unit 740

Examining Unit 730

Sending Unit 750

Second device 122

FIRST DEVICE, COMMUNICATION SERVER, SECOND DEVICE AND METHODS IN A COMMUNICATIONS NETWORK

This application is a 35 U.S.C. § 371 national phase filing of International Application No. PCT/EP2021/057012, filed Mar. 18, 2021, the disclosure of which is incorporated herein by reference in its entirety.

TECHNICAL FIELD

Embodiments herein relate to a first device, a communication server, a second device and a method therein. In some aspects, they relate to handling a sharing of a presentation in an ongoing real-time communication session between the first device and the second device in the communications network.

BACKGROUND

In a typical wireless communication network, wireless devices, also known as wireless communication devices, mobile stations, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

An on-line meeting relies on that some software and hardware works in the devices of the participants in the on-line meeting. Some important parts are devices such as computers or similar that run software that support voice and video communication. Further, the software needs to support on-line, real-time sharing of documents. For example, a meeting leader may want to show the agenda to all meeting participants. To ensure an efficient meeting, it is important that all data exchanges between meeting participants are flawless, i.e. voice should be clear and easy to understand, video as well, and all documents that are shared should appear without input from the receiver, as soon as the network connection allows.

Due to the Covid-19 situation, there has been increased interest and need for online meetings and the use of systems like MS Teams and Zoom has boomed. These systems have improved over time related to stability, quality etc., but the sharing of content to all participants still needs improvements.

SUMMARY

As a part of developing embodiments herein a problem was identified by the inventors and will first be discussed.

There exist solutions today that are capable to extract images from reflections in the eye or from glasses etc. e.g. that extracting reflections on eyeballs from photographs is possible and that faces on these reflections may be identifiable.

For several reasons, the flawless is not really there yet. Example of reasons are:

A network connection cannot provide enough resources to transfer all necessary data in time and may as well vary between receiving users' respective connections.

A user, both the sharing user and the receiving user, does not really understand how to operate to conferencing software or the computer.

The meeting software lacks several functions that could help support an efficient meeting.

As a result of the above parts of the meeting time is allocated to comments such as:

"Can you hear me?"

"Oh, sorry I was muted."

"Can you see my screen?"

"I cannot see anything, are you sharing anything?"

In other words, at the start of a digital meeting, when the meeting leader starts to share a presentation, there is no way to know when the presentation is viewable on receiving side. Unless asking the participants "can you see my screen?".

An object of embodiments herein is to improve the performance of a real-time communication session in a communications network.

According to an aspect of embodiments herein, the object is achieved by a method performed by a first device for handling a sharing of a presentation in an ongoing real-time communication session between the first device and a second device in a communications network. The presentation is displayed in a first screen of the first device and is to be shared in a second screen of the second device. Upon initiating the sharing of the presentation, the first device triggers a front facing camera at the second device to capturing one or more second images towards a face of a second user of the second device.

The first device obtains a feedback relating to whether or not the presentation to be shared is visible at the second screen. The feedback being based on an examining of the one or more second images to identify reflections reflecting the presentation when displayed in the second screen that corresponds to the presentation displayed in the first screen.

According to another aspect of embodiments herein, the object is achieved by a method performed by a second device for assisting a first device in handling a sharing of a presentation in an ongoing real-time communication session between a first device and the second device in a communications network. The presentation is displayed in a first screen of the first device and is to be shared in a second screen of the second device. When the first device initiates the sharing of the presentation, the second device receives a trigger, triggering a front facing camera at the second device to capture one or more second images towards a face of a second user of the second device. The second device receives from the first device, one or more first images of the presentation displayed in the first screen. The second device examines the one or more second images to identify reflections reflecting the presentation when displayed in the second screen that corresponds to the presentation displayed in the first screen according to the received one or more first images. When reflections reflecting the presentation corresponding to the presentation displayed in the first screen has been identified, the second device determines a feedback that the presentation is visible at the second screen. When reflections reflecting the presentation corresponding to the presentation displayed in the first screen has not been identified, the second device determines a feedback that the presentation is not visible at the second screen. The second device sends to the first device, the determined feedback relating to whether or not the presentation to be shared is visible at the second screen.

According to another aspect of embodiments herein, the object is achieved by a method performed by a communication server for assisting a first device in handling a sharing of a presentation in an ongoing real-time communication session between the first device and a second device in a communications network. The presentation is displayed in a first screen of the first device and is to be shared in a second screen of the second device. When the first device initiates the sharing of the presentation, the communication server triggers a front facing camera at the second device to capture one or more second images towards a face of a second user of the second device. The communication server receives from the second device, one or more second images towards the face of the second user of the second device, captured by the front facing camera according to the triggering. The communication server receives from the first device, one or more first images of the presentation displayed in the first screen. The communication server examines the received one or more second images to identify reflections reflecting the presentation when displayed in the second screen that corresponds to the presentation displayed in the first screen according to the received one or more first images. When reflections reflecting the presentation corresponding to the presentation displayed in the first screen has been identified, the communication server determines a feedback that the presentation is visible at the second screen. When reflections reflecting the presentation corresponding to the presentation displayed in the first screen has not been identified, the communication server determines a feedback that the presentation is not visible at the second screen. The communication server sends to the first device, the determined feedback relating to whether or not the presentation to be shared is visible at the second screen.

According to another aspect of embodiments herein, the object is achieved by a first device configured to handle a sharing of a presentation in a real-time communication session between the first device and a second device in a communications network. The presentation is adapted to be displayed in a first screen of the first device and is adapted to be shared in a second screen of the second device. The first device further being configured to:

Upon initiating the sharing of the presentation, trigger a front facing camera at the second device to capture one or more second images towards a face of a second user of the second device, obtain a feedback relating to whether or not the presentation to be shared is visible at the second screen, and which feedback is adapted to be based on an examining of the one or more second images to identify reflections reflecting the presentation when displayed in the second screen that corresponds to the presentation displayed in the first screen.

According to another aspect of embodiments herein, the object is achieved by a second device configured to assist a first device in handling a sharing of a presentation in a real-time communication session between a first device and the second device in a communications network. The presentation is adapted to be displayed in a first screen of the first device and is adapted to be shared in a second screen of the second device. The second device further being configured to:

When the first device initiates the sharing of the presentation, receive a trigger, triggering a front facing camera at the second device to capture one or more second images towards a face of a second user of the second device, receive from the first device, one or more first images of the presentation displayed in the first screen, examine the one or more second images to identify reflections reflecting the presentation when displayed in the second screen that corresponds to the presentation displayed in the first screen according to the received one or more first images, when reflections reflecting the presentation corresponding to the presentation displayed in the first screen has been identified, determine a feedback that the presentation is visible at the second screen, and when reflections reflecting the presentation corresponding to the presentation displayed in the first screen has not been identified, determine a feedback that the presentation is not visible at the second screen, and—send to the first device, the determined feedback relating to whether or not the presentation to be shared is visible at the second screen.

According to another aspect of embodiments herein, the object is achieved by a communication server configured to assist a first device in handling a sharing of a presentation in an ongoing real-time communication session between the first device and a second device in a communications network. The presentation is adapted to be displayed in a first screen of the first device and is adapted to be shared in a second screen of the second device. The communication server further being configured to:

When the first device initiates the sharing of the presentation, trigger a front facing camera at the second device to capture one or more second images towards a face of a second user of the second device, receive from the second device, one or more second images towards the face of the second user of the second device, captured by the front facing camera according to the triggering, receive from the first device, one or more first images of the presentation displayed in the first screen, examine the received one or more second images to identify reflections reflecting the presentation when displayed in the second screen that corresponds to the presentation displayed in the first screen according to the received one or more first images, when reflections reflecting the presentation corresponding to the presentation displayed in the first screen has been identified, determine a feedback that the presentation is visible at the second screen, and when reflections reflecting the presentation corresponding to the presentation displayed in the first screen has not been identified, determine a feedback that the presentation is not visible at the second screen, and send to the first device, the determined feedback relating to whether or not the presentation adapted to be shared is visible at the second screen.

Since the first device triggers a front facing camera at the second device to capturing one or more second images towards a face of a second user of the second device upon initiating the sharing of the presentation, a feedback is obtained relating to whether or not the presentation to be shared is visible at the second screen.

Thanks to that the feedback is based on an examining of the one or more second images to identify reflections reflecting the presentation when displayed in the second screen that corresponds to the presentation displayed in the first screen, an automatic status feedback on the progress of the sharing the presentation is provided. This results in an improved performance of real-time communication sessions in a communications network. This is since the system automatically provides feedback to any user sharing a presentation such as a content and makes synchronization questions, such as can you see the presentation, obsolete By this, make available time for actual meeting activities.

BRIEF DESCRIPTION OF THE DRAWINGS

Examples of embodiments herein are described in more detail with reference to attached drawings in which:

FIG. 3 is a flowchart depicting an embodiment of a method in a first device.

FIG. 4 is a flowchart depicting an embodiment of a method in a second device.

DETAILED DESCRIPTION

Examples of embodiments herein relate to a way of handling a sharing of a presentation in an ongoing real-time communication session between a first device and a second device in a communications network, wherein e.g. an eye reflection feedback of the user of the second device is instantly provided to the first device.

Embodiments herein provide methods that supports device users in real-time communications with helpful feedback. In some embodiments herein the first device, e.g. the presenter, detects when a presentation to be shared appears on remote second device screens. Thus, providing feedback to the first device i.e. the presenter when the second devices, i.e. the listeners, can see shared content and it is ok to start presenting.

It should be noted that the wordings sharing a presentation and sharing a content when used herein means the same thing and may be used interchangeably herein.

When sharing of the presentation is initiated in the first device presenter, the front facing camera at the second device listener(s) captures images, also referred to as takes snapshots, of the listener's face. The first device, a communication server or the second device, e.g. referred to as a function in any of these, examines the images. This is to identify, also referred to as detect, reflections of the presentation e.g. in the listener's/listeners' eyes, corneal reflections and/or reflections from other surfaces within the images. From the reflection the function detects when the shared content is visible at the second device, i.e. the listeners' screens. The function will feedback the status of the screen sharing to the first device, i.e. the presenter.

The embodiments provided herein e.g. may have the advantages to provide automatic recipient-feedback on presentation sharing in an ongoing real-time communication session such as an online meeting.

With embodiments herein, on-line meetings will become more efficient.

Meeting leader may know that at least one, some, sufficiently many, all, etc. meeting participant can see the shared content.

Thus, embodiments herein provide an automatic status feedback on the progress of content sharing.

Figure 1:
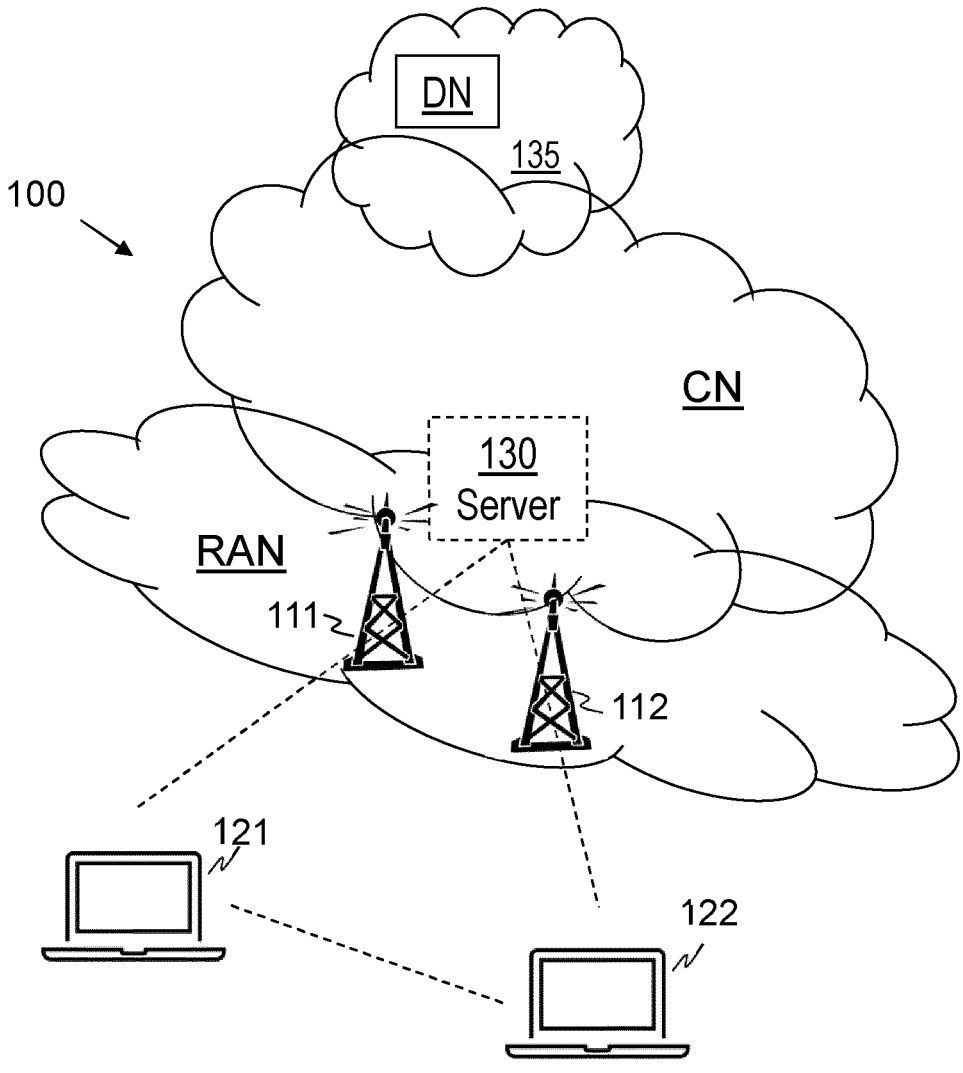
FIG. 1 is a schematic block diagram illustrating embodiments of a communications network.

FIG. 1 is a schematic overview depicting a communications network 100 wherein embodiments herein may be implemented. The communications network 100 e.g. comprises one or more RANs and one or more CNs. The communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

E.g., a number of access points such as a first network node 111 and a second network node 112, operate in the communications network 100. These nodes provide radio coverage in a number of cells which may also be referred to as a beam or a beam group of beams.

The first network node 111, and the second network node 112 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 110 may be referred to as a serving radio network node and communicates with a UE 120 with Downlink (DL) transmissions to the UE 120 and Uplink (UL) transmissions from the UE 120.

One or more devices operate in the wireless communication network 100, such as e.g. the first device 121 and the second device 122. The respective first device 121 and the second device 122 may each be represented by a computer, a tablet, a UE, a mobile station, a wireless terminals, and/or communicate via one or more Access Networks (AN), e.g. RAN via the first network node 111 and/or the second network node 112, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

One or more communication servers, such as e.g. the communication server 130 operate in the wireless communication network 100. The communication server 130 may e.g. be a real-time communication server.

Methods herein may be performed by the first device 121, the communication server 130 and/or the second device 122, e.g. referred to as a function performed in any of these.

As an alternative, a Distributed Node (DN) and functionality, e.g. comprised in a cloud 135 as shown in FIG. 1, may be used for performing or partly performing the methods herein.

It should be noted that the methods performed herein may be referred to as functions, and that the words method and function when used herein may be used interchangeably.

The method may be performed or partly be performed in the communication server 130, such as e.g. a real-time communication server. The communication server 130 obtains both first images from the first device 121, i.e. the presenter, and second images from the second device 122, i.e. the listeners. The second images may be periodically captured and sent to the communication server 130 when the presentation sharing is initiated.

The method may be performed or partly be performed in the first device 121, i.e. the presenter, such as in an application in the first device 121. Hence the second device 122, i.e. the listener, sends the captured second images to the first device 121, i.e. the presenter when the sharing of the presentation is started.

The method may further be performed or partly be performed in the second device 122, i.e. the listener, e.g. in an application in the second device 122. Hence, when the presentation sharing is started the first device 121 may send first images of the presentation displayed in the first screen, e.g. a bitmap, i.e. a small file size, of the presenter's first screen to the second device 122. This is since a low-resolution snippet of the screen may be sufficient to use for detecting reflections. The first device 121 may then send the full resolution of the screen to the second device 122. The function at the second device 122 will compare their reflections with the received bitmap and generate feedback to the first device 121.

When screen sharing is initiated, the front facing camera at the second device 121 captures second images towards the second user's face e.g. the listener's face. The second images are made available for reflection examination. First images of the shared first screen are also made available for reflection examination.

The examination of the images is performed to detect reflection of the second screen e.g. in the listener's/listeners' eye or eyes, corneal reflections and reflections from other surfaces within the second images. From the reflection it is identified when the shared presentation such as the content is visible at the second screen such as the listeners' screen.

A feedback comprising the status of the shared presentation is fed back to the first device 121, i.e. the presenter.

Thus, embodiment herein provide an automatic status feedback on the progress of presentation sharing.

A number of embodiments will now be described, some of which may be seen as alternatives, while some may be used in combination.

Figure 2:
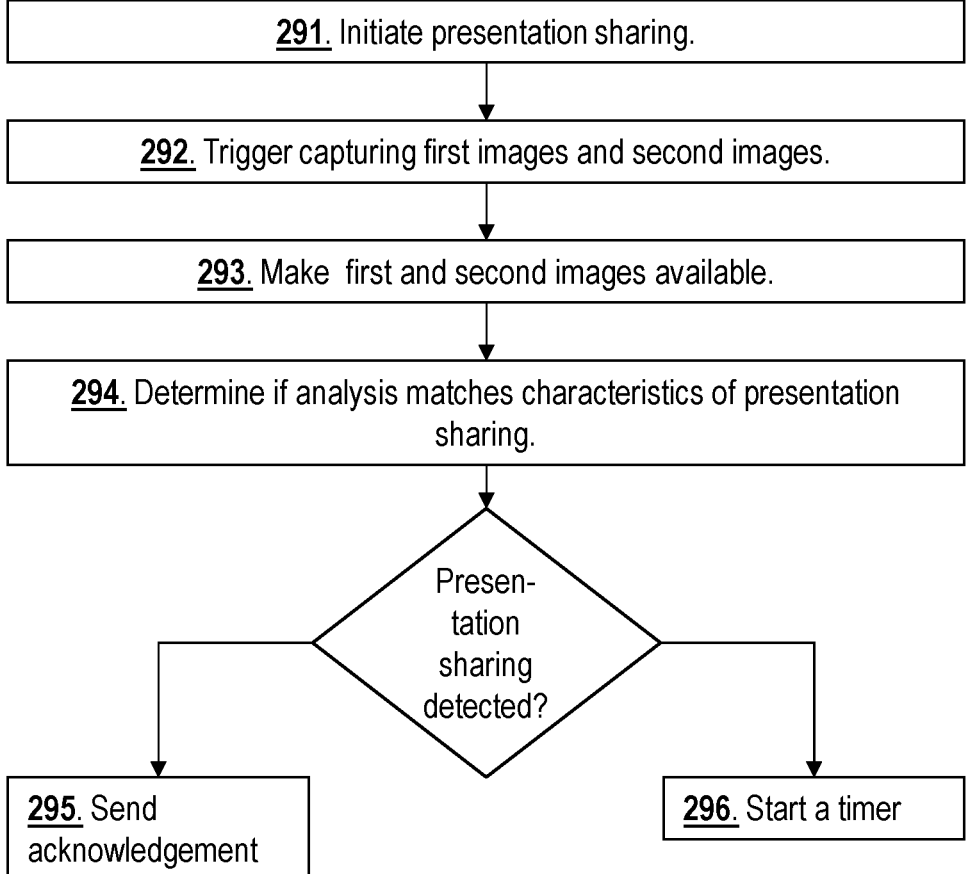
FIG. 2 is a flowchart depicting an embodiment of a method herein.

FIG. 2 illustrates an example of the method according to embodiments herein, wherein a real-time communication session is ongoing between two or more participants such as the first device 121 and its first user, and the second device 122 and its second user.

The first device 121 and its first user initiate 291 sharing of its first screen. In some example scenarios, the first screen is already shared since the real-time communication session ongoing. The first device 121 then starts to share the presentation and may become the presenter. Embodiments herein, may relate to sharing of the presentation or sharing of the screen or sharing of both the screen and the presentation. Therefore, the wording "sharing the presentation" shall be interpreted as any of: Sharing the presentation or sharing the screen or sharing both the screen and the presentation or sharing a content. The presentation to be shared is a visible presentation. This is triggered by the first device 121, such as the presenter that initiate sharing of the presentation or is considered as presenter. This may be performed by analysing image data reflecting reflections of the presenter or content from the second device 122.

The screen sharing initiation or the presentation sharing initiation by the first device 121 and its first user may trigger 292 the first device 121 to capture first images of the shared first screen.

The screen sharing initiation or the presentation sharing initiation by the first device 121 and its first user may further trigger 292 second images to be captured by the second front facing camera at the second device 122, e.g. the listeners front facing cameras, e.g. snapshots are captured.

The first images i.e. at the presenter side and the second images i.e. at the listeners side are made available 293 to the node making the examination, e.g. referred to as an examination function, or the examination part of the method. The node making the examination may be any one out of the first device 121, the communication server 130 and/or the second device 122, e.g. referred to as a function in any of these.

The second images are examined to identify, such as determine 294 if reflections reflecting the presentation when displayed in the second screen that corresponds to the presentation displayed in the first screen. The examination may be a cornea analysis if the second image, e.g. cornea image of the second user, reveal a change that the presentation now appears, i.e. is visible in the second screen, that matches characteristics of first screen showing the presentation that is to be shared.

When reflections reflecting the presentation corresponding to the presentation displayed in the first screen has been identified, the feedback will be that the presentation is visible at the second screen. E.g. if screen sharing or presentation sharing is now detected, the examining node 121, 122, 130, provides, such as sends 295 a feedback, e.g. an Acknowledgement (ACK) to the first device 121. The second user of the second device 122 will be able to follow, e.g. via a User Interface (UI), as the presentation sharing progresses, e.g., slide bar, time glass, etc. The presentation sharing may be accepted as a pre-determined number of participant devices comprising the first device 121 and the second device 122 that have responded with an ACK, e.g. meaning that the presentation is visible on the second screen.

When reflections reflecting the presentation corresponding to the presentation displayed in the first screen has not been identified, the feedback will be that the presentation is not visible at the second screen. E.g. if screen sharing or presentation sharing is not detected, the examining node 121, 122, 130, e.g. if screen sharing is not detected, a timer may be started 296. Participant devices such as the first device 121 and the second device 122, may respond with the feedback such as a Negative ACK (NAK or NACK) and a reason, e.g., bad link, with a certain frequency. If screen share is detected within the timer expires, a feedback such as an ACK may be sent. In other cases, an indication is sent to the first device 121 for further actions.

Please assume the following example scenario in the below description of FIGS. 3, 4 and 5.

Regarding the first device 121: According to an example scenario, the first user is a presenter and will use a first screen in the first device 121 for a presentation to be shared in an ongoing real-time communication session between the first device 121 and the second device 122. The first device 121 is in some embodiments capable of capturing one or more first images of a presentation displayed in the first screen of the first device 121.

Regarding the second device 122: According to the example scenario, a second user is a listener and is using a second screen in the second device 122 for participating in the ongoing real-time communication session between the first device 121 and the second device 122. The second device 122 comprises or is attached to a front facing camera that is capable of capturing one or more second images.

It should be noted that the wordings first and second are only to be seen as names used to differentiate rather than relating to any order.

The front facing camera when used herein means a camera that may be located at or close to the second device 122 and is directed from the second device 122 towards the front of the second user, e.g. the face of the second user. The front facing camera may be triggered when the first device 121 starts presenting or screen sharing. This is to capture second image data reflecting reflections from second user of shared content from the first device 121.

The real-time communication session between the first device 121 and the second device 122 is started. The first user starts its presentation which becomes visible for the first user at the first screen. The first user now wants to share the presentation with the second user so that the presentation becomes visible also for the second user in the second screen.

The examining of the second images according to embodiments herein may be performed by the first device 121, the communication server 130 and/or the second device 122. Below, the method will be described when performed in the first device 121 together with FIG. 3, when performed in the communication server 130 together with FIG. 4 and when performed in the second device 122 together with FIG. 5.

FIG. 3 shows example embodiments of a method performed by the first device 121. The method is for handling, such as e.g. deal with, a sharing of a presentation in an ongoing real-time communication session between the first device 121 and the second device 121 in the communications network 100.

In these embodiments, the examination part of the method according to embodiments herein may be performed by any of the first device 121, the communication server 130 and/or the second device 122.

A presentation when used herein should be read as a broad term comprising e.g. any content that the first user wishes to share with thew second user. Such a presentation may e.g. be a document, a PowerPoint presentation, an excel diagram, a website, a picture, a video, images, a document, a drawing, a map, an application, an application workspace Graphical User Interface (GUI), text and/or code editor, mouse pointer indicator, icon, taskbar and/or sidebar, file browser etc.

To share a presentation when used herein e.g. means that instead of sending a presentation for others such as the second user to see or edit, in an email attachment or upload a file for others to access, the presentation may be shared as an online version of the presentation and it may be specified whether the second user has permission to make changes or has permission only to view. This means that many participants such as the first user and the second user can look at the same presentation at the same time when shared online in the ongoing real-time communication session. With everyone seeing the same presentation, at the same time, the participants may start collaborating in real-time. Sharing documents online makes it easier for groups to work together, wherever they are.

The wording "sharing a presentation" is to interpreted broad and the wording covers "sharing a presentation", "sharing a screen", and "sharing a content", and all these wordings may be used interchangeably herein. The presentation to be shared is a visible presentation.

The presentation is displayed in a first screen of the first device and is to be shared in a second screen of the second device. This means that the presentation is visible for the first user in the first device 121. The method comprises the following actions, which actions may be taken in any suitable order. Optional actions are referred to as dashed boxes in FIG. 3.

Action 301

Upon initiating the sharing of the presentation, the first device 121 triggers a front facing camera at the second device 122 to capture one or more second images towards a face of a second user of the second device 122.

Images, such as first images and second images, when used herein should be read as a broad term. Such images may e.g. comprise pictures, video, pictures, IR picture, bitmaps, Quick Response (QR) codes, 2D/3D point clouds, 2D/3D graphical patters or objects, such as open and/or closed line segments, triangles, squares, polygons, circles, ovals, etc., where certain parts of graphical objects may be associated with certain colour, brightness, hue, contrast, erc etc.

In some embodiments, the triggering of the front facing camera at the second device 122 upon initiating the sharing of the presentation, is performed by: Instructing the communication server 130 to trigger the front facing camera at the second device 122 to capturing one or more second images towards a face of the second user of the second device 122.

In some embodiments, the triggering of the front facing camera at the second device 122 comprises triggering the front facing camera at the second device 122 to periodically capturing the one or more second images towards a face of the second user of the second device 122. This is an advantage since it may give rise to different angel captures of the second user reflection, and it may increase probability that at least one sufficiently sharp reflection is achieved.

This may proceed until any one out of:

The reflections reflecting the presentation corresponding to the presentation displayed in the first screen has been identified and/or a time period has exceeded.

The time period may e.g. be a pre-determined timer one of many examples would be from triggered start to a couple of minutes, e.g. 0.5-30 seconds, or 1-5 sec, or anything around or in-between, a timer period in respect to detected user movement or non-movement, a timer set according to ambient light conditions where dark==longer time given that more light needs to be allowed to be collected at detecting device.

In some embodiments the reflections of the captured one or more second images, reflecting the presentation when displayed in the second screen comprises reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

Action 302

In some embodiments, the first device 121 sends to the communication server 130, one or more first images of the presentation displayed in the first screen. This is e.g. when the examination part of the method is performed by the communication server 130.

In some other embodiments, the first device 121 sends to the second device 122, one or more first images of the presentation displayed in the first screen. This is e.g. when the examination part of the method is performed by the second device 122.

The one or more first images will be used for comparison with the one or more second images later on, by the node performing the examination part of the method.

Action 303

The first device 121 obtains a feedback relating to whether or not the presentation to be shared is visible at the second screen. The feedback is based on an examining of the one or more second images to identify reflections reflecting the presentation when displayed in the second screen that corresponds to the presentation displayed in the first screen.

The examining of the second images according to embodiments herein may be performed by the first device 121, the communication server 130 and/or the second device 122. In some embodiments, the first device 121 may perform the examination part of the method by examining the second images itself. In some other embodiments, the first device 121 obtains the feedback by receiving it from the examination part of the method, such as the communication server 130 or the second device 122.

Corresponds to, here may mean that there is a good enough match between the one or more second images and the presentation displayed in the first screen, in some embodiments the one or more first images.

The examining of the one or more second images to identify reflections may e.g. be performed by image processing of reflections from eye, glasses, smartphone, smartwatch, or other reflective objects within range of the front facing camera.

In some embodiments, when reflections reflecting the presentation corresponding to the presentation displayed in the first screen has been identified, the feedback is that the presentation is visible at the second screen, and when reflections reflecting the presentation corresponding to the presentation displayed in the first screen has not been identified, the feedback is that the presentation is not visible at the second screen.

In some embodiments, wherein the examination part of the method according to embodiments herein is performed by the first device 121 the obtaining 303 of the feedback relating to whether or not the presentation to be shared is visible at the second screen, is performed by:

Receiving one or more second images towards the face of the second user of the second device 122, captured by the front facing camera at the second device 122 according to the triggering, examining the received the one or more second image to identify reflections reflecting the presentation when displayed in the second screen that corresponds to the presentation displayed in the first screen, when reflections reflecting the presentation corresponding to the presentation displayed in the first screen has been identified, determining that the feedback is that the presentation is visible at the second screen, and when reflections reflecting the presentation corresponding to the presentation displayed in the first screen has not been identified, determining that the feedback is that the presentation is not visible at the second screen.

In some alternative embodiments, the examination part of the method according to embodiments herein is performed by the communication server 130, and the first device 121 has sent one or more first images to the communication server 130, see Action 302. In these embodiments, the first device 121 obtains the feedback relating to whether or not the presentation to be shared is visible at the second screen, by receiving it from the communication server 130. The feedback is further based on the one or more first images of the presentation displayed in the first screen.

In some further alternative embodiments, the examination part of the method according to embodiments herein is performed by the second device 122 and the first device 121 has sent one or more first images to the second device 122, see Action 302. In these embodiments, the first device 121 may obtain the feedback relating to whether or not the presentation to be shared is visible at the second screen, by receiving it from the communication server 130. The feedback is further based on the one or more first images.

FIG. 4 shows some example embodiments of a method performed by the second device 122. The method is for assisting the first device 121 in handling a sharing of a presentation in an ongoing real-time communication session between the first device 121 and the second device 122 in the communications network 100.

In these embodiments, the examining of the second images according to embodiments herein is performed by the second device 122.

The presentation is displayed in a first screen of the first device 121 and is to be shared in a second screen of the second device 122 The method comprises the following actions, which actions may be taken in any suitable order. Optional actions are referred to as dashed boxes in FIG. 4.

Action 401

When the first device 121 initiates the sharing of the presentation, the second device 122 receives a trigger. The trigger triggers the front facing camera at the second device 122 to capture one or more second images towards a face of a second user of the second device 122.

In some embodiments, the triggering of the front facing camera at the second device 122, comprises, e.g. is performed by, triggering the front facing camera at the second device 122 to periodically capturing the one or more second images towards a face of the second user of the second device 122. This may proceed until any one out of:

reflections reflecting the presentation corresponding to the presentation displayed in the first screen has been identified and/or a time period has exceeded.

In this way the second device 122 will obtain one or more second images.

Action 402

The second device 122 receives one or more first images from the first device 122. The one or more first images of the presentation displayed in the first screen.

The one or more first images will be used later on for comparison with the one or more second images in the examination part of the method, which in this embodiment is performed by the second device 122.

Action 403

The second device 122 examines the one or more second images. This is to identify reflections reflecting the presentation when displayed in the second screen that corresponds to the presentation displayed in the first screen according to the received one or more first images. The reflections may reveal that the presentation is displayed in the second screen.

In some embodiments, the reflections of the captured one or more second images, reflecting the presentation when displayed in the second screen comprises reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

Action 404

When reflections reflecting the presentation corresponding to the presentation displayed in the first screen has been identified, the second device 122 determines a feedback that the presentation is visible at the second screen. I.e. the second device 122 determines that the feedback is that the presentation is visible at the second screen.

Action 405

When reflections reflecting the presentation corresponding to the presentation displayed in the first screen has not been identified, the second device 122 determines a feedback that the presentation is not visible at the second screen. I.e. the second device 122 determines that the feedback is that the presentation is not visible at the second screen.

Action 406

The second device 122 then sends the determined feedback to the first device 121, the determined feedback relating to whether or not the presentation to be shared is visible at the second screen. In this way the first user of the first device 121 automatically will get notified that the second user of the second device 122 is able to see the shared presentation. The feedback is preferably sent instantly e.g. to avoid unnecessary questions from the first user about whether the second user can see the presentation, like "can you see the presentation" etc.

This may be sent to the first device 121 in the communication session data flow, or as a separate data flow using e.g. File Transfer Protocol (ftp) or HyperText Transfer Protocol (HTTP).

Figure 5:
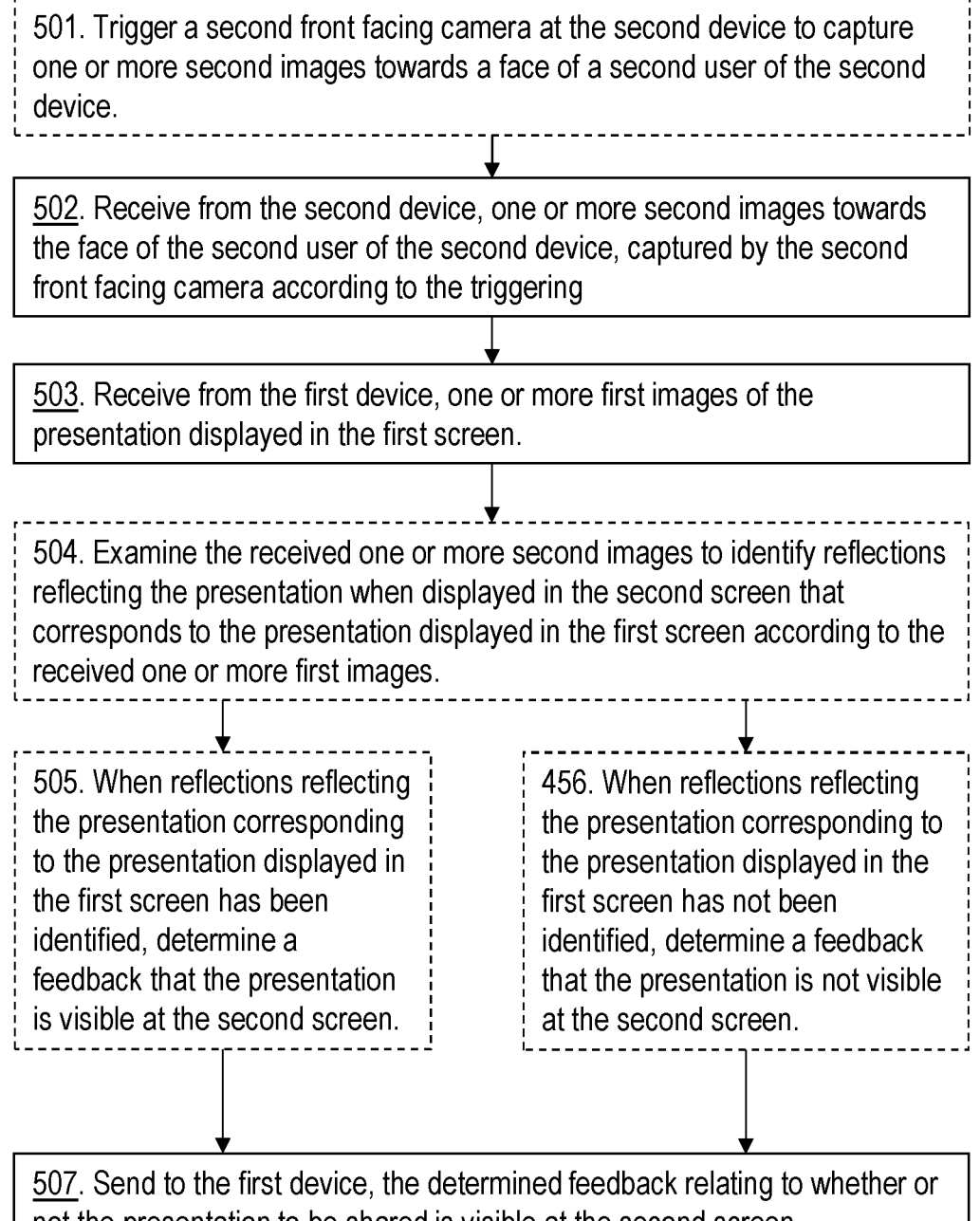
FIG. 5 is a flowchart depicting an embodiment of a method in a communication server.

FIG. 5 shows some example embodiments of a method performed by the communication server 130. The method is for assisting the first device 121 in handling a sharing of a presentation in an ongoing real-time communication session between the first device 121 and the second device 122 in the communications network 100.

In these embodiments, the examination part of the method according to embodiments herein is performed by the communication server 130.

The presentation is displayed in a first screen of the first device 121 and is to be shared in a second screen of the second device 122.

The method comprises the following actions, which actions may be taken in any suitable order. Optional actions are referred to as dashed boxes in FIG. 5.

Action 501

When the first device 121 initiates the sharing of the presentation, the communication server 130 may trigger the front facing camera at the second device 122 to capture one or more second images towards a face of a second user of the second device 122.

In some embodiments the triggering of the front facing camera at the second device 122 upon initiating the sharing of the presentation, is performed by receiving an instruction from the first device 121. This instruction instructs the communication server 130 to trigger the front facing camera at the second device 122 to capturing one or more second images towards a face of the second user of the second device 122, by forwarding the instruction to the second device 122. This is to trigger the front facing camera at the second device 122 to capturing one or more second images towards a face of the second user of the second device 122.

In some embodiments the triggering of the front facing camera at the second device 122, comprises, e.g. is performed by, triggering the front facing camera at the second device 122 to periodically capturing the one or more second images towards a face of the second user of the second device 122. This may be performed, e.g. proceeded, until any one out of:

reflections reflecting the presentation corresponding to the presentation displayed in the first screen has been identified and/or a time period has exceeded.

In some embodiments, the reflections of the captured one or more second images, reflecting the presentation when displayed in the second screen comprises reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

Action 502

The communication server 130 receives one or more second images from the second device 122. The one or more second images are captured by the front facing camera towards the face of the second user of the second device 122, according to the triggering.

Action 503

The communication server 130 receives one or more first images from the first device 122. The one or more first images comprises, e.g. depicts the presentation displayed in the first screen.

Action 504

The communication server 130 examines the received one or more second images. This is to identify reflections reflecting the presentation when displayed in the second screen that corresponds to the presentation displayed in the first screen according to the received one or more first images.

Action 505

When reflections reflecting the presentation corresponding to the presentation displayed in the first screen has been identified, the communication server 130 determines a feedback that the presentation is visible at the second screen. I.e. the second device 122 determines that the feedback is that the presentation is visible at the second screen.

Action 506

When reflections reflecting the presentation corresponding to the presentation displayed in the first screen has not been identified, the communication server 130 determines a feedback that the presentation is not visible at the second screen. I.e. the second device 122 determines that the feedback is that the presentation is not visible at the second screen.

Action 507

The communication server 130 then sends the determined feedback to the first device 121. The determined feedback relates to whether or not the presentation to be shared is visible at the second screen.

Similar as in the embodiments above, in this way the first user of the first device 121 automatically will get notified that the second user of the second device 122 is able to see the shared presentation. The feedback is preferably sent instantly e.g. to avoid unnecessary questions from the first user about whether the second user can see the presentation, like "can you see my presentation?".

This may be sent to the first device 121 by using Hyper-Text Transfer Protocol (HTTP).

The above embodiments will now be further explained and exemplified below. The embodiments below may be combined with any suitable embodiment above.

Some First Embodiments

In an example scenario of some first embodiments there will be one presenter, i.e. the first device 121, also referred to as sender, and at least one listener, i.e. at least one second device 122, also referred to as receivers. As a prerequisite, a real-time communication session is ongoing or is initiated between the first device 122 and at least one second device 122.

The first device 121, i.e. the presenter initiates a sharing of a presentation such as a screen sharing. A presentation sharing message such as a screen sharing message may be sent from the first device to the second device 122. The message may trigger a front facing camera at the second device 122 to capturing one or more second images towards a face of a second user of the second device 122. This is related to Actions 301, 401, and 501 as described above.

One or more first images, such as e.g. snapshots, depicting the first screen of the first device 121, i.e. the presenter, are made available to a reflection examine function. The a reflection examine function, is also referred to as the node or function performing the examination part, or part of the examination part, of the method according to embodiments herein which may be any of the first device 121, the communication server 130 and/or the second device 122.

In some of these first embodiments, the one or more first images are of smaller file size than the size of the data that represents the presentation, e.g. the shared screen, e.g. a bit map, or a thumbnail.

In another of these first embodiments the one or more first images comprise some distinct patterns of the presentation, such as e.g. the shared screen. In another of these first embodiments the one or more first images comprise some distinct patterns not shown at the presentation, e.g. the shared screen, but is only used as a prompting screen and the listeners, e.g. a QR code. This is related to Actions 302, 402, and 503 as described above.

The second device 122 receives a message from the first device 121, or in some embodiments from the communication server 130. The message informs that the presentation, e.g. screen sharing, has been initiated, also referred to as started. As mentioned above, the message may trigger a front facing camera at the second device 122 to capturing one or more second images towards a face of a second user of the second device 122.

As soon as the second device 122 is made aware of that the sharing of presentation, e.g. the screen sharing, is initiated, the front facing camera at the second device 122 captures one or more second images, e.g. takes snapshots, towards the face of the second user of the second device 122. This is related to Actions 301, 401, and 501 as described above.

The one or more second images are made available to the reflection examine function. The reflection examine function performing the examination part, may be any of the first device 121, the communication server 130 and/or the second device 122. This is related to Actions 303, and 502 as described above.

The reflection function performing the examination part of the method according to embodiments herein, may be comprised in any of the first device 121, the communication server 130 and/or the second device 122. The reflection function examines the one or more second images to detect any reflection of the presentation, such as e.g. the presenter's second screen. What is to be detected is the reflection of the presentation e.g. in the listener's/listeners' eyes such as corneal reflections, and/or reflections from other surfaces within the one or more second images.

The reflection function identifies reflections reflecting the presentation when displayed in the second screen that corresponds to the presentation displayed in the first screen according to the received one or more first images. E.g., from the reflections the function detects when the presentation, e.g. the shared screen, is visible at the second screen of the second device 122, i.e. the listeners' screen. When there is a correlation such as e.g. a good enough match between the presentation, e.g. the screen being shared, e.g. depicted in the one or more first images, and the reflections identified in the one or more second images, it is determined that the presentation is visible in the second screen of the second device 122.

Good enough may e.g. be a statistical correlation between the one or more second reflection images and the one or more first images, over a certain threshold.

Depending on second device 122 settings, image/pattern, etc., the one or more second images may have to be flipped/transposed/rotated to align with the one or more first images.

This is related to Actions 303, 403-405, and 504-507 as described above.

The reflection function may then feedback the status of the screen sharing to the presenter. The first device 121, i.e. the presenter is informed about whether the presentation is being visible e.g. at the good enough match in second device 122 second screen. The first device 121 may be informed with a binary ACK/NACK, or e.g. with a matching metric, e.g. 5%-100.

This is related to Action 303, 406, and 507 as described above.

The procedure starting from after the first device 121, have initiated a sharing of a presentation such as a screen sharing may be periodically repeated for a given time period for the second device 122 when, it as described above, has not had a good enough match.

In one of the first embodiments, when the time period is over a final NACK message may be generated to the first device 121, i.e. the presenter about these listeners.

In some embodiments further actions may be taken for a second device 122 for which the presentation sharing failed, e.g. the screen sharing failed.

A sharing application in the second device 122 may initiate content upload to a meeting server such as the communication server 130 for the second device 122, e.g. the recipients, to manually download and managing of content.

FURTHER EMBODIMENTS

In some embodiments the communication server 130 is involved. The communication server 130 may e.g. be a real-time commutation server such as a real-time commutation meeting server. The examination part of the method according to embodiments herein is in these embodiments placed in the communication server 130. The communication server 130 both has the one or more first images of the presentation in first screen of first device 121, such as the presenter, and the one or more second images of the reflecting the second screen of the second device 122, such as e.g. the listener, which is being periodically taken and may sent to the communication server 130 when presentation sharing, e.g. the screen sharing is initiated.

In some alternative embodiments, the examination part of the method according to embodiments herein is placed in the first device 121 such as the presenter's device e.g. an application in the first device 121. Hence the second device 122 such as the listener sends the one or more second images to the first device 121, such as the presenter when presentation sharing, such as e.g. screen sharing, is started.

In some alternative embodiments, the examination part of the method according to embodiments herein is placed in the second device 122, such as the listeners' device e.g. an application in the second device 121. Hence, when the presentation sharing, such as e.g. the screen sharing, is initiated, also referred to as started, the first device 121 sends the one or more first images, e.g. as a bit map, and/or small file size. The one or more first images depicted the first screen of first device 121 wherein e.g. the presentation is visible in the first screen. The first device 121 may then sends the one or more first images as a full resolution of the screen. The examination part at the second device 122, such as the listener, will compare the reflections in the one or more second images with the received one or more first images and generate feedback to the first device 121 such as the presenter.

In some further embodiments, the first device 121 may receive feedback as some visual indication about the progress of successful content sharing on the receiver side, e.g. counter that participant 1-*n*, e.g. including the second device 122, or a bar that is filled etc.

The feedback may also be provided to all participants, including the second device 122, in the ongoing real-time communication session to make all aware about the status of the presentation sharing.

Another embodiment may be related to remote support. There is a number of steps that needs to be taken in order to create a trusted remote access to a user's computer such as the first device 121 and the second device 122. It may be beneficial to make use of the above-mentioned method to support the authorization process.

As mentioned above, another aspect of embodiments herein is that in the one or more second images, reflections may also be analyzed from other surfaces then the second user's eyes, such as reflections in the background, e.g. second user glasses, metal objects, mirrors, glass (paintings), etc.

In low light conditions, the second device 122 such as an applications in the second device 122 may invoke build in light sources, or adjusting screen light intensity, to improve corneal or e.g. glass reflections; increased light may be one-flash like or that application in an incremental manner increase screen brightness until light threshold value is sufficiency fulfilled.

Similarly, the second device's 122 light source and/or camera may consider emitting and/or detecting reflections in other spectrum than visible light, e.g. invoking Infra-Red (IR) light source that may act less disturbing to second users' sight.

Figure 6A:
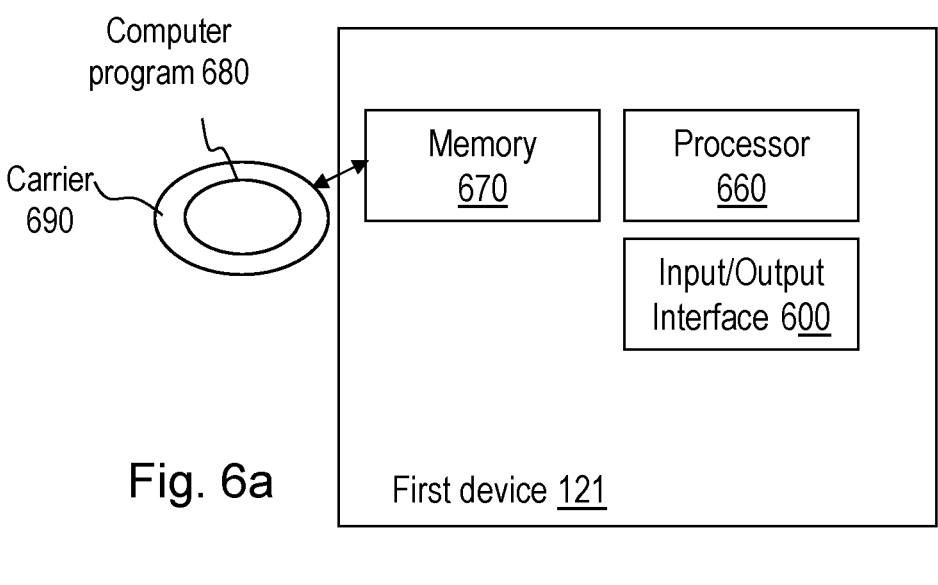
FIG. 6*a-b* are schematic block diagrams illustrating embodiments of a first device.
Figure 6B:
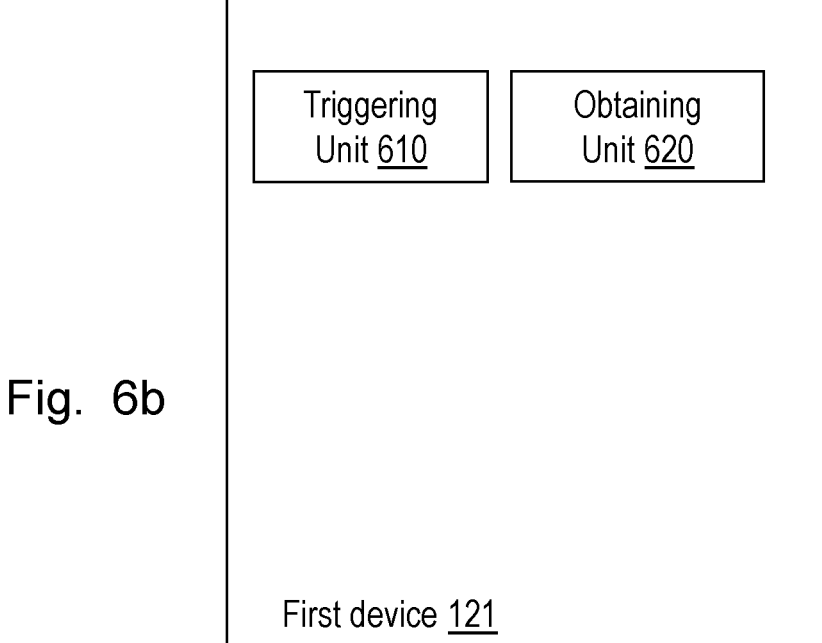

To perform the method actions above, the first device 121 is configured to handle a sharing of a presentation in a real-time communication session between the first device 121 and the second device 122 in a communications network 100. The presentation is adapted to be displayed in a first screen of the first device 121 and is adapted to be shared in a second screen of the second device 122, the first device 121. The first device 121 may comprise an arrangement depicted in FIGS. 6a and 6b.

The first device 121 may comprise an input and output interface 600 configured to communicate with network entities such as e.g. the second device 122 and the communication server 130. The input and output interface 600 may comprise a wireless receiver not shown and a wireless transmitter not shown.

The first device 121 may further be configured to, e.g. by means of a triggering unit 610 in the first device 121, upon initiating the sharing of the presentation, trigger a front facing camera at the second device 122 to capture one or more second images towards a face of a second user of the second device 122.

The first device 121 may further be configured to, e.g. by means of the triggering unit 610 in the first device 121, trigger the front facing camera at the second device 122, by:

upon initiating the sharing of the presentation, instructing a communication server 130 to trigger the front facing camera at the second device 122 to capture one or more second images towards a face of the second user of the second device 122.

The first device 121 may further be configured to, e.g. by means of the triggering unit 610 in the first device 121, trigger the front facing camera at the second device 122 by:

triggering the front facing camera at the second device 122 to periodically capture the one or more second images towards a face of the second user of the second device 122 until any one out of:

reflections reflecting the presentation corresponding to the presentation displayed in the first screen has been identified and/or a time period has exceeded.

The first device 121 may further be configured to, e.g. by means of an obtaining unit 620 in the first device 121, obtain a feedback relating to whether or not the presentation to be shared is visible at the second screen, which feedback is adapted to be based on an examining of the one or more second images to identify reflections reflecting the presentation when displayed in the second screen that corresponds to the presentation displayed in the first screen.

The first device 121 may further be configured to, e.g. by means of the obtaining unit 620 in the first device 121, obtain the feedback relating to whether or not the presentation to be shared is visible at the second screen by:

receiving one or more second images towards the face of the second user of the second device 122, captured by the front facing camera at the second device 122 according to the triggering, examining the received one or more second image to identify reflections reflecting the presentation displayed in the second screen that corresponds to the presentation displayed in the first screen, when reflections reflecting the presentation corresponding to the presentation displayed in the first screen has been identified, determining that the feedback is that the presentation is visible at the second screen, and when reflections reflecting the presentation corresponding to the presentation displayed in the first screen has not been identified, determining that the feedback is that the presentation is not visible at the second screen.

The first device 121 may further be configured to, e.g. by means of the obtaining unit 620 in the first device 121, obtain the feedback relating to whether or not the presentation to be shared is visible at the second screen by:

sending to a communication server 130, one or more first images of the presentation displayed in the first screen, and receiving the feedback from the communication server 130, which feedback is adapted to be based on the one or more first images of the presentation displayed in the first screen.

The first device 121 may further be configured to, e.g. by means of the obtaining unit 620 in the first device 121, obtain the feedback relating to whether or not the presentation to be shared is visible at the second screen, by:

sending to the second device 122, one or more first images of the presentation displayed in the first screen, and receiving the feedback from the communication server 130, which feedback is adapted to be based on the one or more first images.

In some embodiments, when reflections reflecting the presentation corresponding to the presentation displayed in the first screen has been identified, the feedback is adapted to be that the presentation is visible at the second screen, and when reflections reflecting the presentation corresponding to the presentation displayed in the first screen has not been identified, the feedback is adapted to be that the presentation is not visible at the second screen.

In some embodiments, when reflections reflecting the presentation corresponding to the presentation displayed in the first screen has been identified, the feedback is adapted to be that the presentation is visible at the second screen, and when reflections reflecting the presentation corresponding to the presentation displayed in the first screen has not been identified, the feedback is adapted to be that the presentation is not visible at the second screen.

In some embodiments, the reflections of the captured one or more second images, reflecting the presentation when displayed in the second screen are adapted to comprise reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

The embodiments herein may be implemented through a respective processor or one or more processors, such as the processor 660 of a processing circuitry in the first device 121 depicted in FIG. 6_a_, together with respective computer program code for performing the functions and actions of the embodiments herein. The program code mentioned above may also be provided as a computer program product, for instance in the form of a data carrier carrying computer program code for performing the embodiments herein when being loaded into the first device 121. One such carrier may be in the form of a CD ROM disc. It is however feasible with other data carriers such as a memory stick. The computer program code may furthermore be provided as pure program code on a server and downloaded to the first device 121.

The first device 121 may further comprise a memory 670 comprising one or more memory units. The memory 670 comprises instructions executable by the processor in first device 121. The memory 670 is arranged to be used to store e.g. information, indications, data, presentations, configurations, and applications to perform the methods herein when being executed in the first device 121.

In some embodiments, a computer program 680 comprises instructions, which when executed by the respective at least one processor 660, cause the at least one processor of the first device 121 to perform the actions above.

In some embodiments, a respective carrier 690 comprises the respective computer program 680, wherein the carrier 690 is one of an electronic signal, an optical signal, an electromagnetic signal, a magnetic signal, an electric signal, a radio signal, a microwave signal, or a computer-readable storage medium.

Those skilled in the art will appreciate that the units in the first device 121 described above may refer to a combination of analog and digital circuits, and/or one or more processors configured with software and/or firmware, e.g. stored in the first device 121, that when executed by the respective one or more processors such as the processors described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

To perform the method actions above, the second device 122 configured to assist the first device 121 in handling a sharing of a presentation in a real-time communication session between the first device 121 and the second device 122 in the communications network 100. The presentation is adapted to be displayed in a first screen of the first device

121 and is adapted to be shared in a second screen of the second device 122. The second device 122 may comprise an arrangement depicted in FIGS. 7a and 7b.

The second device 122 may comprise an input and output interface 700 configured to communicate with network entities such as e.g. the first device 121 and the communication server 130. The input and output interface 700 may comprise a wireless receiver not shown and a wireless transmitter not shown.

The second device 122 may further be configured to, e.g. by means of a triggering unit 710, when the first device 121 initiates the sharing of the presentation, receive a trigger, triggering a front facing camera at the second device 122 to capture one or more second images towards a face of a second user of the second device 122.

The second device 122 may further be configured to, e.g. by means of the triggering unit 710, trigger the front facing camera at the second device 122 by:

triggering the front facing camera at the second device 122 to periodically capture the one or more second images towards a face of the second user of the second device 122 until any one out of:

reflections reflecting the presentation corresponding to the presentation displayed in the first screen has been identified and/or a time period has exceeded.

The second device 122 may further be configured to, e.g. by means of a receiving unit 720, receive from the first device 122, one or more first images of the presentation displayed in the first screen.

The second device 122 may further be configured to, e.g. by means of an examining unit 730, examine the one or more second images to identify reflections reflecting the presentation when displayed in the second screen that corresponds to the presentation displayed in the first screen according to the received one or more first images.

The second device 122 may further be configured to, e.g. by means of a determining unit 740, when reflections reflecting the presentation corresponding to the presentation displayed in the first screen has been identified, determine a feedback that the presentation is visible at the second screen.

The second device 122 may further be configured to, e.g. by means of the determining unit 740, when reflections reflecting the presentation corresponding to the presentation displayed in the first screen has not been identified, determine a feedback that the presentation is not visible at the second screen.

The second device 122 may further be configured to, e.g. by means of a sending unit 750, send to the first device 121, the determined feedback relating to whether or not the presentation to be shared is visible at the second screen.

In some embodiments, the reflections of the captured one or more second images, reflecting the presentation when displayed in the second screen are adapted to comprise reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

Figure 7A:
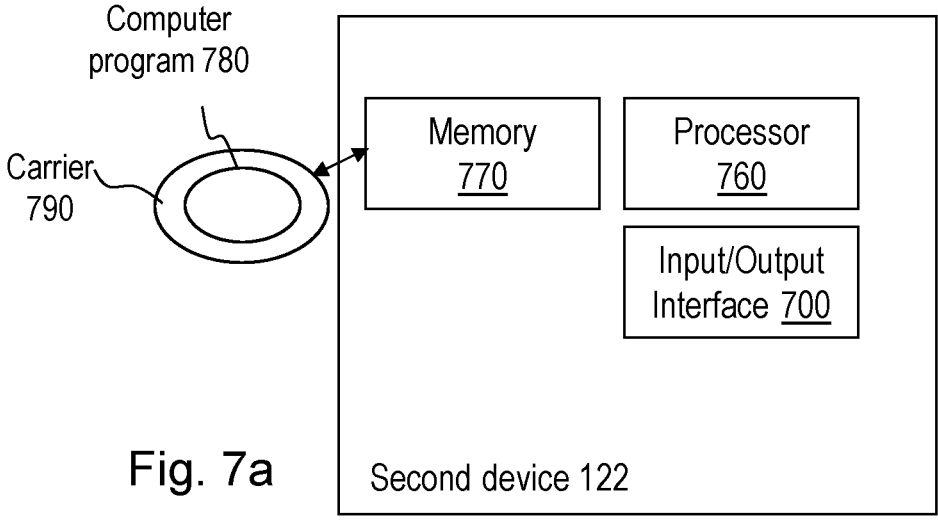
FIG. 7*a-b* are schematic block diagrams illustrating embodiments of a second device.
Figure 7B:
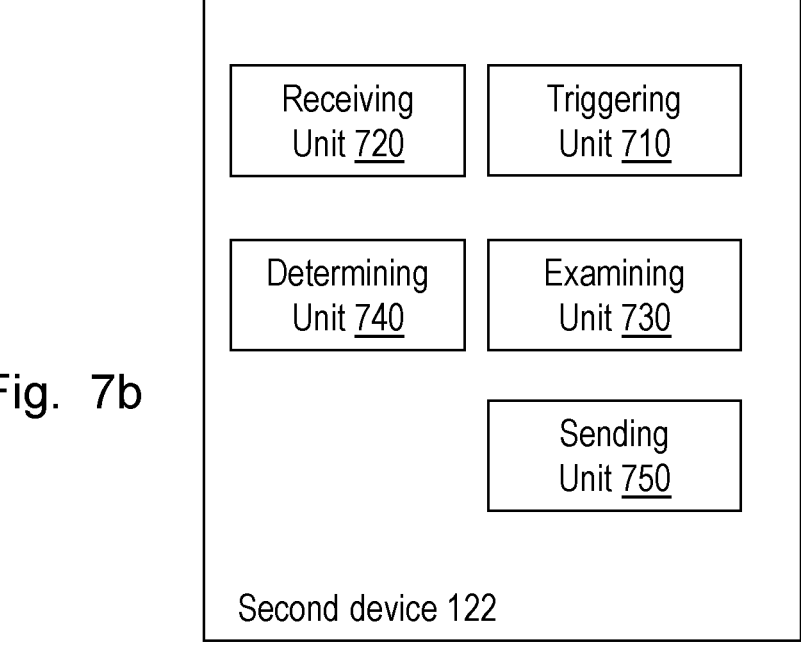

The embodiments herein may be implemented through a respective processor or one or more processors, such as the processor 760 of a processing circuitry in the second device 122 depicted in FIG. 7a, together with respective computer program code for performing the functions and actions of the embodiments herein. The program code mentioned above may also be provided as a computer program product, for instance in the form of a data carrier carrying computer program code for performing the embodiments herein when being loaded into the second device 122. One such carrier may be in the form of a CD ROM disc. It is however feasible with other data carriers such as a memory stick. The computer program code may furthermore be provided as pure program code on a server and downloaded to the second device 122.

The second device 122 may further comprise a memory 770 comprising one or more memory units. The memory 770 comprises instructions executable by the processor in second device 122. The memory 770 is arranged to be used to store e.g. information, indications, data, presentations, configurations, and applications to perform the methods herein when being executed in the second device 122.

In some embodiments, a computer program 780 comprises instructions, which when executed by the respective at least one processor 760, cause the at least one processor of the second device 122 to perform the actions above.

In some embodiments, a respective carrier 790 comprises the respective computer program 780, wherein the carrier 790 is one of an electronic signal, an optical signal, an electromagnetic signal, a magnetic signal, an electric signal, a radio signal, a microwave signal, or a computer-readable storage medium.

Those skilled in the art will appreciate that the units in the second device 122 described above may refer to a combination of analog and digital circuits, and/or one or more processors configured with software and/or firmware, e.g. stored in the second device 122, that when executed by the respective one or more processors such as the processors described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

To perform the method actions above, the communication server 130 is configured to assist the first device 121 in handling a sharing of a presentation in an ongoing real-time communication session between the first device 121 and the second device 122 in the communications network 100. The presentation is adapted to be displayed in a first screen of the first device 121 and is adapted to be shared in a second screen of the second device 122. The communication server 130 may comprise an arrangement depicted in FIGS. 8a and 8b.

The communication server 130 may comprise an input and output interface 800 configured to communicate with network entities such as e.g. the second device 122 and the first device 121. The input and output interface 800 may comprise a wireless receiver not shown and a wireless transmitter not shown.

The communication server 130 may further be configured to, e.g. by means of a triggering unit 810, when the first device 121 initiates the sharing of the presentation, trigger a front facing camera at the second device 122 to capture one or more second images towards a face of a second user of the second device 122.

The communication server 130 may further be configured to, e.g. by means of the triggering unit 810, to trigger the front facing camera at the second device 122 by:

upon initiating the sharing of the presentation, receiving an instruction from the first device 121, instructing to trigger the front facing camera at the second device 122 to capture one or more second images towards a face of the second user of the second device 122, and forwarding the instruction to the second device 122 to trigger the front facing camera at the second device 122 to capture one or more second images towards a face of the second user of the second device 122.

The communication server 130 may further be configured to, e.g. by means of the triggering unit 810, trigger a front facing camera at the second device 122 by:

triggering the front facing camera at the second device 122 to periodically capture the one or more second images towards a face of the second user of the second device 122 until any one out of:

reflections reflecting the presentation corresponding to the presentation displayed in the first screen has been identified and/or a time period has exceeded.

The communication server 130 may further be configured to, e.g. by means of a receiving unit 820, receive from the second device 122, one or more second images towards the face of the second user of the second device 122, captured by the front facing camera according to the triggering.

The communication server 130 may further be configured to, e.g. by means of the receiving unit 820, receive from the first device 122, one or more first images of the presentation displayed in the first screen.

The communication server 130 may further be configured to, e.g. by means of an examining unit 830, examine the received one or more second images to identify reflections reflecting the presentation when displayed in the second screen that corresponds to the presentation displayed in the first screen according to the received one or more first images.

The communication server 130 may further be configured to, e.g. by means of a determining unit 840, when reflections reflecting the presentation corresponding to the presentation displayed in the first screen has been identified, determine a feedback that the presentation is visible at the second screen.

The communication server 130 may further be configured to, e.g. by means of the determining unit 840, when reflections reflecting the presentation corresponding to the presentation displayed in the first screen has not been identified, determine a feedback that the presentation is not visible at the second screen.

The communication server 130 may further be configured to, e.g. by means of a sending unit 850, send to the first device 121, the determined feedback relating to whether or not the presentation adapted to be shared is visible at the second screen.

In some embodiments the reflections of the captured one or more second images, reflecting the presentation when displayed in the second screen, are adapted to comprise reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

Figure 8A:
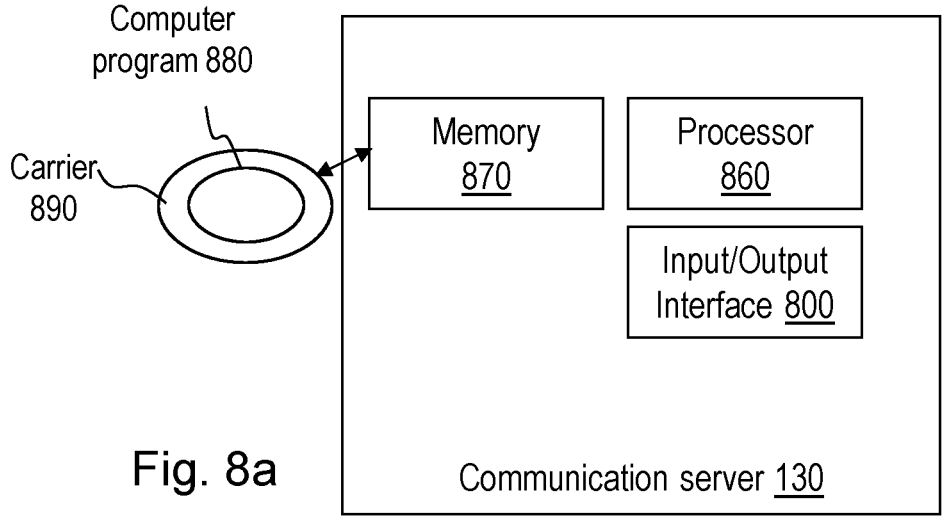
FIG. 8*a-b* are schematic block diagrams illustrating embodiments of a communication server.
Figure 8B:
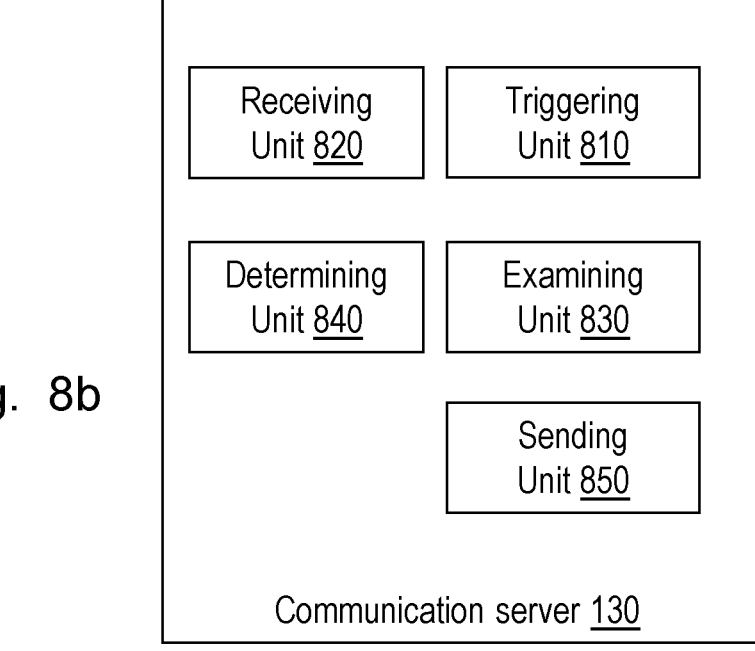

The embodiments herein may be implemented through a respective processor or one or more processors, such as the processor 860 of a processing circuitry in the communication server 130 depicted in FIG. 8a, together with respective computer program code for performing the functions and actions of the embodiments herein. The program code mentioned above may also be provided as a computer program product, for instance in the form of a data carrier carrying computer program code for performing the embodiments herein when being loaded into the communication server 130. One such carrier may be in the form of a CD ROM disc. It is however feasible with other data carriers such as a memory stick. The computer program code may furthermore be provided as pure program code on a server and downloaded to the communication server 130.

The communication server 130 may further comprise a memory 870 comprising one or more memory units. The memory 870 comprises instructions executable by the processor in communication server 130. The memory 870 is arranged to be used to store e.g. information, indications, presentations, data, configurations, and applications to perform the methods herein when being executed in the communication server 130.

In some embodiments, a computer program 880 comprises instructions, which when executed by the respective at least one processor 860, cause the at least one processor of the communication server 130 to perform the actions above.

In some embodiments, a respective carrier 890 comprises the respective computer program 880, wherein the carrier 890 is one of an electronic signal, an optical signal, an electromagnetic signal, a magnetic signal, an electric signal, a radio signal, a microwave signal, or a computer-readable storage medium.

Those skilled in the art will appreciate that the units in the communication server 130 described above may refer to a combination of analog and digital circuits, and/or one or more processors configured with software and/or firmware, e.g. stored in the communication server 130, that when executed by the respective one or more processors such as the processors described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

Figure 9:
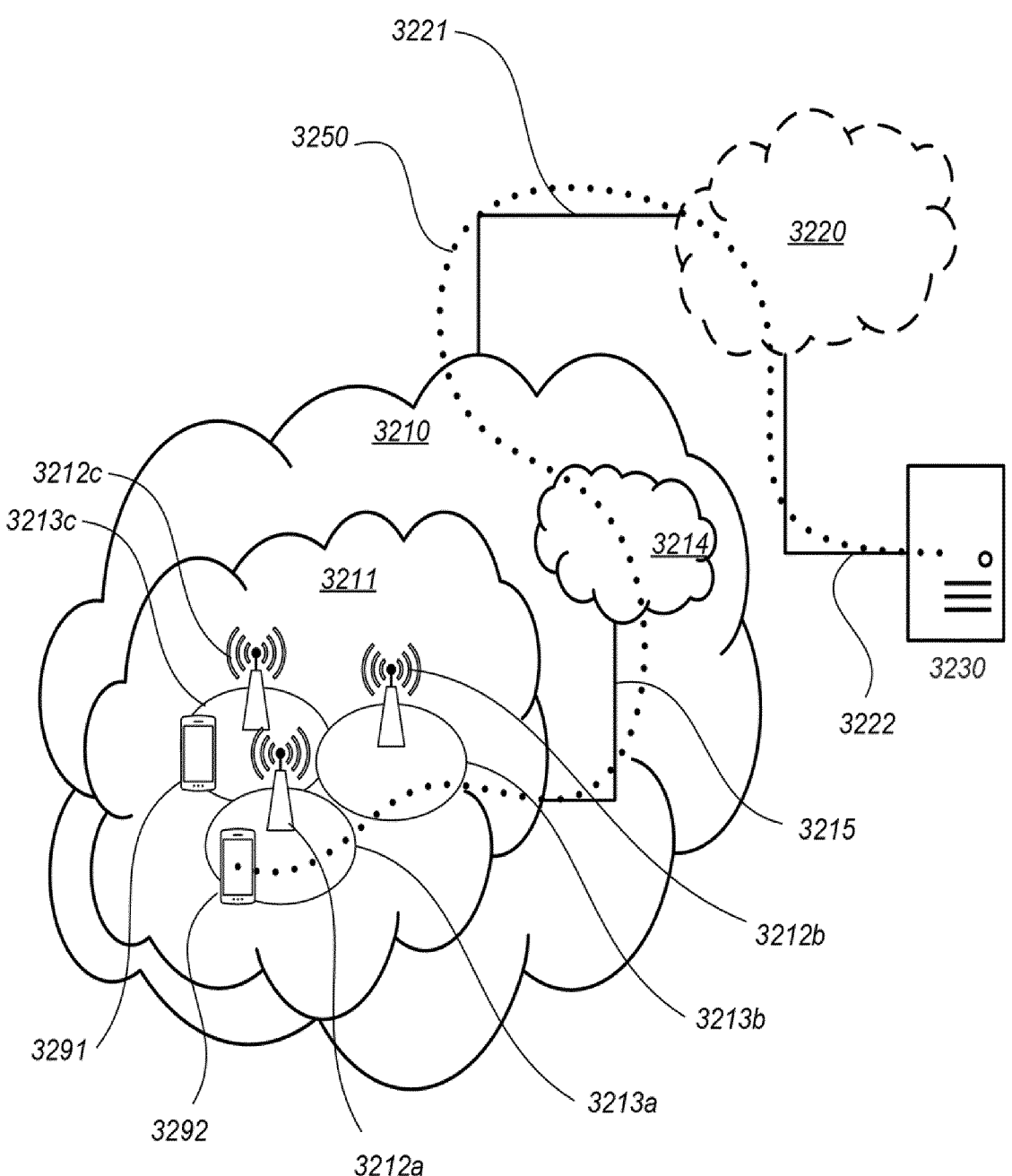
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, e.g. communications network 100, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c, e.g. the first device 121. A second UE 3292 such as a Non-AP STA in coverage area 3213a is wirelessly connectable to the corresponding base station 3212a e.g. the second device 122. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 20) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

Figure 10:
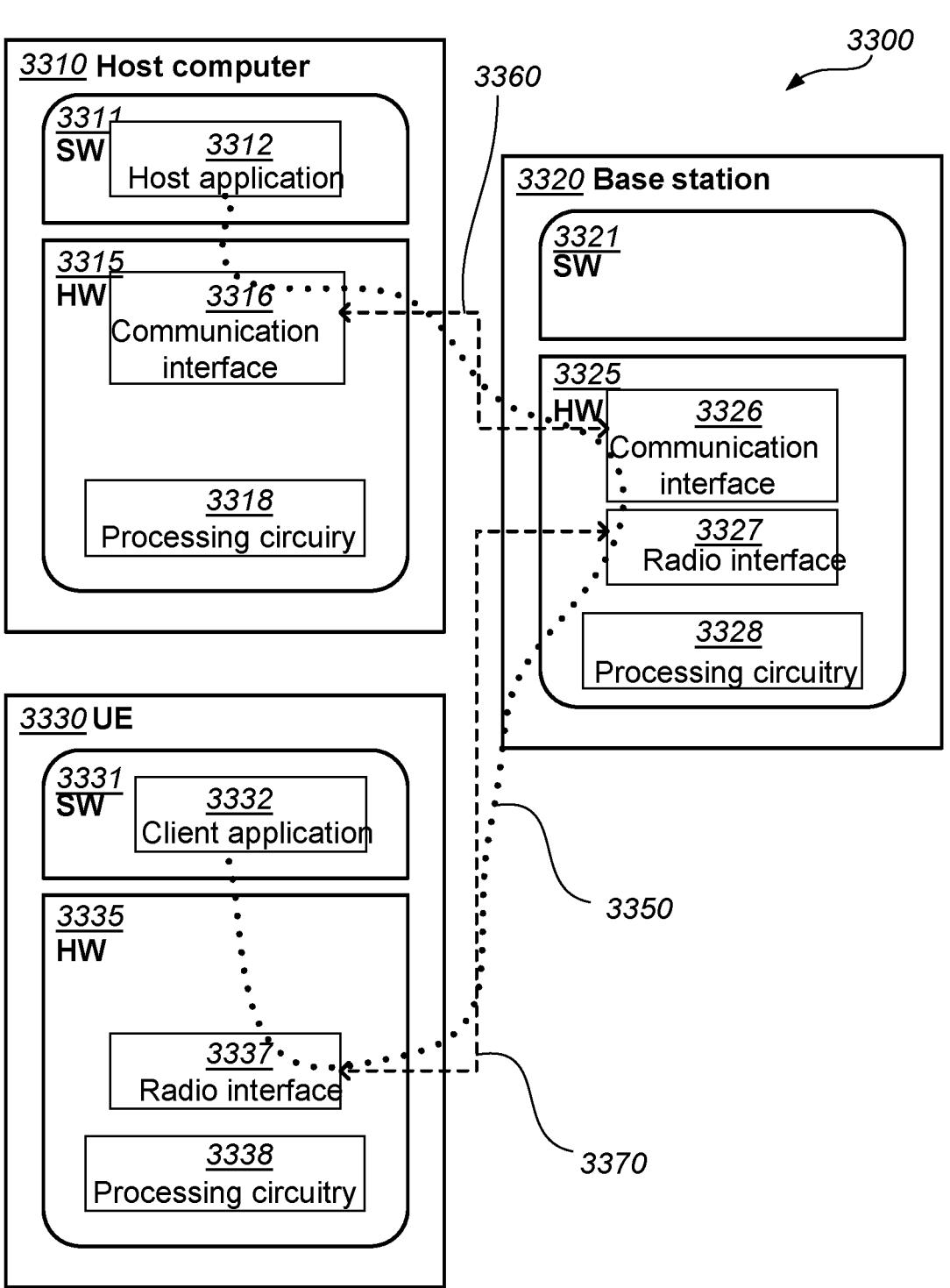
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency and user experience and thereby provide benefits such as reduced user waiting time, better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
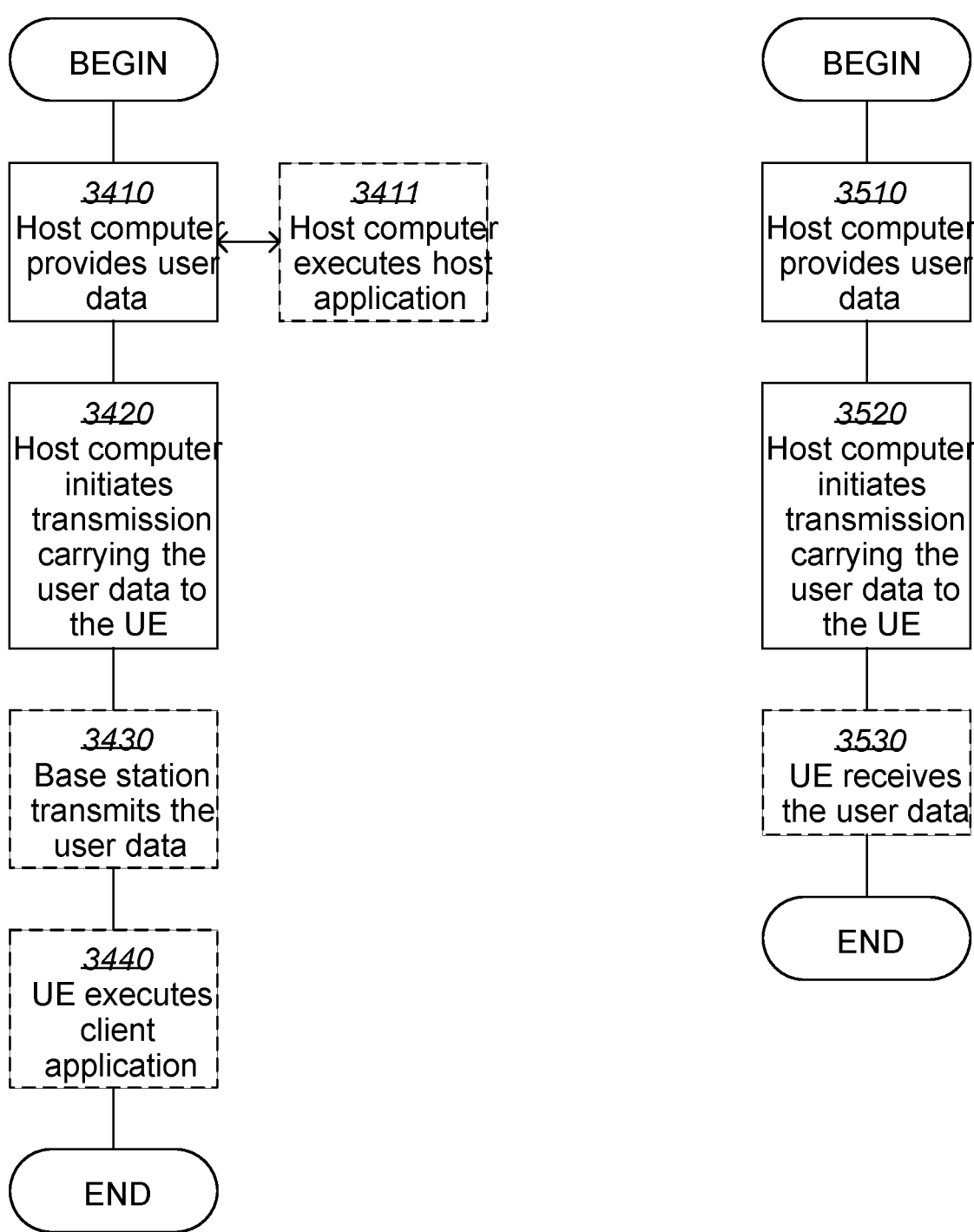
FIGS. 11-12 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 11 will be included in this section. In a first step 3410 of the method, the host computer provides user data. In an optional sub step 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 12 will be included in this section. In a first step 3510 of the method, the host computer provides user data. In an optional sub step (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 13, 14:
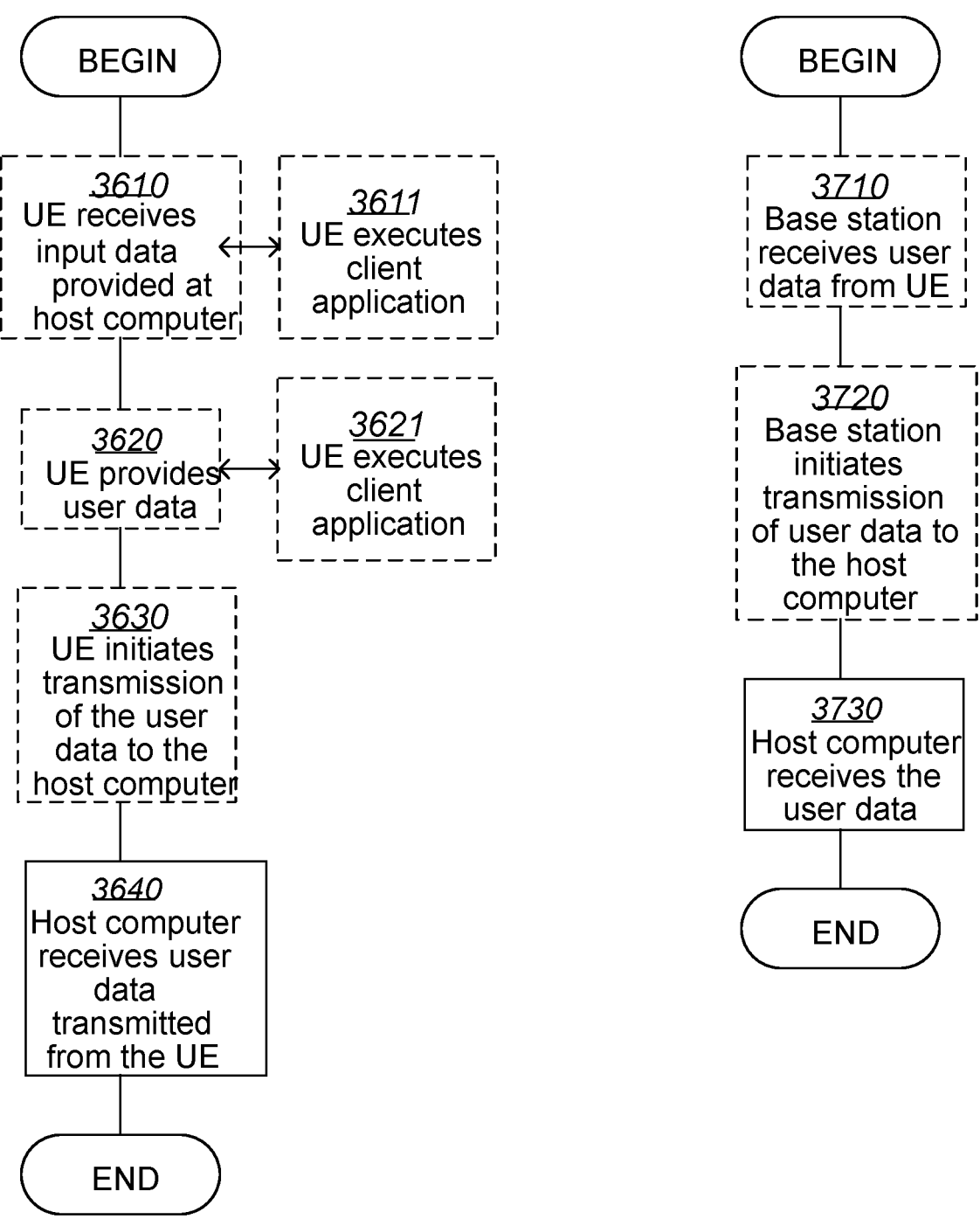
FIGS. 13-14 are flowcharts illustrating methods implemented in a communication system.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional sub step 3621 of the second step 3620, the UE provides the user data by executing a client application. In a further optional sub step 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub step 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviations | |
|---|---|
| Abbreviation | Explanation |
| 3GPP | 3rd Generation Partnership Project |
| 4G | 4th Generation |
| 5G | 5th Generation |
| 5GC | 5G Core |
| 5GS | 5G System |
| IR | Infrared |
| UE | User Equipment |

The invention claimed is:

1. A method performed by a second device for assisting a first device in handling a sharing of a presentation in an ongoing real-time communication session between the first device and the second device in a communications network, which the presentation is displayed in a first screen of the first device and is to be shared in a second screen of the second device, the method comprising:

when the first device initiates the sharing of the presentation, receiving a trigger, triggering a front facing camera at the second device to capture one or more second images towards a face of a second user of the second device, receiving from the first device, one or more first images of the presentation displayed in the first screen, examining the one or more second images to identify reflections reflecting the presentation when displayed in the second screen that corresponds to the presentation displayed in the first screen according to the received one or more first images, when the reflections reflecting the presentation corresponding to the presentation displayed in the first screen have been identified, determining a feedback that the presentation is visible at the second screen, and when the reflections reflecting the presentation corresponding to the presentation displayed in the first screen have not been identified, determining a feedback that the presentation is not visible at the second screen, and sending to the first device, the determined feedback relating to whether or not the presentation to be shared is visible at the second screen.

2. The method according to claim 1, wherein the reflections of the captured one or more second images, reflecting the presentation when displayed in the second screen comprises reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

3. The method according to claim 1, wherein the triggering of the front facing camera at the second device, comprises:

triggering the front facing camera at the second device to periodically capturing the one or more second images towards the face of the second user of the second device until any one out of:

the reflections reflecting the presentation corresponding to the presentation displayed in the first screen has been identified and/or a time period has exceeded.

4. A method performed by a communication server for assisting a first device in handling a sharing of a presentation in an ongoing real-time communication session between the first device and a second device in a communications network, which the presentation is displayed in a first screen of the first device and is to be shared in a second screen of the second device, the method comprising:

receiving from the second device, one or more second images towards a face of a second user of the second device, captured by a front facing camera, receiving from the first device, one or more first images of the presentation displayed in the first screen, examining the received one or more second images to identify reflections reflecting the presentation when displayed in the second screen that corresponds to the presentation displayed in the first screen according to the received one or more first images, when the reflections reflecting the presentation corresponding to the presentation displayed in the first screen have been identified, determining a feedback that the presentation is visible at the second screen, and when the reflections reflecting the presentation corresponding to the presentation displayed in the first screen have not been identified, determining a feedback that the presentation is not visible at the second screen, and sending to the first device, the determined feedback relating to whether or not the presentation to be shared is visible at the second screen.

5. The method according to claim 4, further comprising:

when the first device initiates the sharing of the presentation, triggering the front facing camera at the second device to capture the one or more second images towards the face of the second user of the second device.

6. The method according to claim 5, wherein the triggering of the front facing camera at the second device, is performed by:

upon initiating the sharing of the presentation, receiving an instruction from the first device, instructing to trigger the front facing camera at the second device to capture the one or more second images towards the face of the second user of the second device, by forwarding the instruction to the second device to trigger the front facing camera at the second device to capturing the one or more second images towards the face of the second user of the second device.

7. The method according to claim 5, wherein the triggering of the front facing camera at the second device, comprises:

triggering the front facing camera at the second device to periodically capturing the one or more second images towards the face of the second user of the second device until any one out of:

the reflections reflecting the presentation corresponding to the presentation displayed in the first screen has been identified and/or a time period has exceeded.

8. The method according to claim 4, wherein the reflections of the captured one or more second images, reflecting the presentation when displayed in the second screen comprises reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

9. A second device configured to assist a first device in handling a sharing of a presentation in a real-time communication session between the first device and the second device in a communications network, which the presentation is adapted to be displayed in a first screen of the first device and is adapted to be shared in a second screen of the second device, the second device further being configured to:

when the first device initiates the sharing of the presentation, receive a trigger, triggering a front facing camera at the second device to capture one or more second images towards a face of a second user of the second device, receive from the first device, one or more first images of the presentation displayed in the first screen, examine the one or more second images to identify reflections reflecting the presentation when displayed in the second screen that corresponds to the presentation displayed in the first screen according to the received one or more first images, when the reflections reflecting the presentation corresponding to the presentation displayed in the first screen have been identified, determine a feedback that the presentation is visible at the second screen, and when the reflections reflecting the presentation corresponding to the presentation displayed in the first screen have not been identified, determine a feedback that the presentation is not visible at the second screen, and send to the first device, the determined feedback relating to whether or not the presentation to be shared is visible at the second screen.

10. The second device according to claim 9, wherein the reflections of the captured one or more second images, reflecting the presentation when displayed in the second screen are adapted to comprise reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

11. The second device according to claim 9, further configured to trigger the front facing camera at the second device by:

triggering the front facing camera at the second device to periodically capture the one or more second images towards the face of the second user of the second device until any one out of:

the reflections reflecting the presentation corresponding to the presentation displayed in the first screen has been identified and/or a time period has exceeded.

12. A communication server configured to assist a first device in handling a sharing of a presentation in an ongoing real-time communication session between the first device and a second device in a communications network, which the presentation is adapted to be displayed in a first screen of the first device and is adapted to be shared in a second screen of the second device, the communication server further being configured to:

receive from the second device, one or more second images towards a face of a second user of the second device, captured by a front facing camera according to a triggering, receive from the first device, one or more first images of the presentation displayed in the first screen, examine the received one or more second images to identify reflections reflecting the presentation when displayed in the second screen that corresponds to the presentation displayed in the first screen according to the received one or more first images, when the reflections reflecting the presentation corresponding to the presentation displayed in the first screen have been identified, determine a feedback that the presentation is visible at the second screen, and when the reflections reflecting the presentation corresponding to the presentation displayed in the first screen have not been identified, determine a feedback that the presentation is not visible at the second screen, and send to the first device, the determined feedback relating to whether or not the presentation adapted to be shared is visible at the second screen.

13. The communication server according to claim 12 further being configured to:

when the first device initiates the sharing of the presentation, trigger the front facing camera at the second device to capture the one or more second images towards the face of the second user of the second device.

14. The communication server according to claim 13 further being configured to trigger the front facing camera at the second device by:

upon initiating the sharing of the presentation, receiving an instruction from the first device, instructing to trigger the front facing camera at the second device to capture the one or more second images towards the face of the second user of the second device, by forwarding the instruction to the second device to trigger the front facing camera at the second device to capture the one or more second images towards the face of the second user of the second device.

15. The communication server according to claim 13 further configured to trigger the front facing camera at the second device by:

triggering the front facing camera at the second device to periodically capture the one or more second images towards the face of the second user of the second device until any one out of:

the reflections reflecting the presentation corresponding to the presentation displayed in the first screen has been identified and/or a time period has exceeded.

16. The communication server according to claim 13, wherein the reflections of the captured one or more second images, reflecting the presentation when displayed in the second screen, are adapted to comprise reflections from a reflecting object comprising any one or more out of:

an eye of the second user or any person watching the presentation beside the second user, glasses of the second user or any person watching the presentation beside the second user, a visor of the second user or any person watching the presentation beside the second user, a mirror and/or window in the environment of the second user, and any reflecting object.

* * * * *